United States Patent
Yu et al.

(10) Patent No.: US 9,923,466 B2
(45) Date of Patent: Mar. 20, 2018

(54) DC-DC CONVERTER WITH INDUCTOR CURRENT DIRECTION REVERSED EACH SWITCHING PERIOD

(71) Applicant: Fraunhofer-Gesellschaft zur Foerderung der angewandten Forschung e.V., Munich (DE)

(72) Inventors: Zhe Yu, Henstedt-Ulzburg (DE); Klaus F. Hoffmann, Hamburg (DE); Holger Kapels, Bad Oldesloe (DE)

(73) Assignee: Fraunhofer-Gesellschaft Zur Foerderung Der Angewandlen Forschung E.V., Munich (DE)

( * ) Notice: Subject to any disclaimer, the term of this patent is extended or adjusted under 35 U.S.C. 154(b) by 0 days.

(21) Appl. No.: 15/066,316

(22) Filed: Mar. 10, 2016

(65) Prior Publication Data

US 2016/0190932 A1 Jun. 30, 2016

Related U.S. Application Data

(63) Continuation of application No. PCT/EP2014/069266, filed on Sep. 10, 2014.

(30) Foreign Application Priority Data

Sep. 11, 2013 (DE) .................. 10 2013 218 228

(51) Int. Cl.
*H02M 3/158* (2006.01)
*H02M 1/14* (2006.01)
*H02M 1/00* (2006.01)

(52) U.S. Cl.
CPC ........... *H02M 3/1582* (2013.01); *H02M 1/14* (2013.01); *H02M 2001/0058* (2013.01)

(58) Field of Classification Search
CPC .................. H02M 3/1582; H02M 2001/0058
See application file for complete search history.

(56) References Cited

U.S. PATENT DOCUMENTS 6,166,527 A    12/2000  Dwelley et al.
6,798,177 B1 *  9/2004  Liu .................... H02M 3/1582
                                                    323/222

(Continued)

FOREIGN PATENT DOCUMENTS

CH           699920 B1    5/2010
DE    102006005853 A1    8/2007

OTHER PUBLICATIONS

International Preliminary Report on Patentability dated Mar. 15, 2016 for International Application No. PCT/EP2014/069266.

(Continued)

*Primary Examiner* — Harry Behm
(74) *Attorney, Agent, or Firm* — Eschweiler & Potashnik, LLC

(57) ABSTRACT

Embodiments of the present invention provide a DC-DC converter having a first DC voltage gate, a second DC voltage gate and a storage choke. The storage choke is coupled between the first DC voltage gate and the second DC voltage gate by means of electric switching elements. The DC-DC converter is configured such that a direction of a current flow through the storage choke is inverted at least once during a switching period of the electric switching elements. Further, the DC-DC converter is configured to track or readjust a switching frequency of the electric switching elements in case of a change of operating parameters of the DC-DC converter such that a change of direction of the current flow through the storage choke during a switching period of the electric switching elements is ensured.

23 Claims, 26 Drawing Sheets

(56) References Cited

U.S. PATENT DOCUMENTS

| | | | |
|---|---|---|---|
| 8,860,387 B2 | 10/2014 | Kobayashi | |
| 2004/0027101 A1* | 2/2004 | Vinciarelli | H02M 3/1582 |
| | | | 323/259 |
| 2004/0085048 A1 | 5/2004 | Tateishi | |
| 2005/0206354 A1 | 9/2005 | Ikezawa | |
| 2009/0146623 A1 | 6/2009 | de Cremoux et al. | |
| 2009/0219001 A1 | 9/2009 | Kimura | |
| 2011/0316497 A1 | 12/2011 | Sardat et al. | |
| 2012/0146594 A1 | 6/2012 | Kobayashi | |
| 2015/0022167 A1* | 1/2015 | LoCascio | H02M 3/155 |
| | | | 323/282 |

OTHER PUBLICATIONS

International Search Report dated Jan. 12, 2014 International Application No. PCT/EP2014/069266.

* cited by examiner

DC-DC CONVERTER WITH INDUCTOR CURRENT DIRECTION REVERSED EACH SWITCHING PERIOD

CROSS-REFERENCE TO RELATED APPLICATIONS

This application is a continuation of copending International Application No. PCT/EP2014/069266, filed Sep. 10, 2014, which is incorporated herein by reference in its entirety, and additionally claims priority from German Application No. 10 201 3 218 228.7, filed Sep. 11, 2013, which is also incorporated herein by reference in its entirety.

BACKGROUND

Embodiments of the present invention relate to a DC-DC converter. Further embodiments relate to a method for operating a DC-DC converter. Some embodiments relate to a concept for resonant (switching) loss reduction of a bidirectional cascaded buck-boost converter.

Nowadays, for obtaining stable and highly efficient energy supply, many regenerative energy systems are designed by a bidirectional DC-DC converter with intermediate energy storage elements. The same have the function of adjusting different voltage levels. Accordingly, it can happen in many applications that the ranges of input and output voltage of the DC-DC converter overlap when charging and discharging the energy storages. Consequently, a specific type of DC-DC converters is necessitated, which can be operated both in the boost mode and in the buck mode.

Due to its simple topology and high performance, the cascaded buck-boost converter switch four switches is frequently used for such applications. As an interface between regenerative energy systems and energy storages, the efficiency of the DC-DC converter has a significant influence on the efficiency of the overall system. Consequently, concepts for minimizing power losses in the cascaded buck-boost converter are urgently needed.

U.S. Pat. No. 6,166,527 presents a control concept for the buck-boost converter for reducing power losses. Depending on the ratio of input and output voltage, the DC-DC converter is operated in three different modes, buck mode, boost mode, or buck-boost mode. Thereby, power losses of the DC-DC converter are reduced during buck and boost modes, but due to the simultaneous operation of the four switches, losses in the buck-boost mode still remain too high.

US 2012/0146594 A1 presents a control concept for the cascaded buck-boost converter with four switches. With the help of the concept, the cascaded buck-boost converter can operate in five different modes. These are the buck mode, the buck mode at half the switching frequency, the buck-boost mode at half the switching frequency, the boost mode at half the switching frequency and the boost mode. With approximating input and output voltages, the switching frequency of the PWM signals by which the switches are controlled is halved. Thereby, the range of buck and boost modes can be expanded and the range of the lossy buck-boost modes can be shortened accordingly. On the other hand, theoretically, the switching losses can be reduced by 50% in the range where the switching frequency is reduced by half. In summary, it can be stated that by using this concept, the efficiency of the DC-DC converter can be improved in the transition phase between buck mode and boost mode. However, in this concept, the switches are still hard switched such that the efficiency of the buck-boost converter is greatly limited.

SUMMARY

According to an embodiment, a DC-DC converter may have: a first DC voltage gate; a second DC voltage gate; and a storage choke coupled between the first DC voltage gate and the second DC voltage gate by means of electric switching elements; wherein the DC-DC converter is configured such that a direction of a current flow through the storage choke is inverted at least once during a switching period of the electric switching elements; and wherein the DC-DC converter is configured to track or readjust a switching frequency of the electric switching elements in case of a change of operating parameters of the DC-DC converter such that a change of direction of the current flow through the storage choke during a switching period of the electric switching elements is ensured.

According to another embodiment, a method for operating a DC-DC converter including a first DC voltage gate, a second DC voltage gate and a storage choke coupled between the first DC voltage gate and the second DC voltage gate by means of electric switching elements, wherein the DC-DC converter is configured such that a direction of a current flow through the storage choke is inverted at least once during a switching period of the electric switching elements, may have the step of: tracking or readjusting a switching frequency of the electric switching elements in case of a change of operating parameters of the DC-DC converter such that a change of direction of the current flow through the storage choke during a switching period of the electric switching elements is ensured.

Another embodiment may have a non-transitory digital storage medium having a computer program stored thereon to perform the inventive method when said computer program is run by a computer.

According to another embodiment, a DC-DC converter may have: a first DC voltage gate; a second DC voltage gate; and a storage choke coupled between the first DC voltage gate and the second DC voltage gate by means of electric switching elements; wherein the DC-DC converter is configured such that a direction of a current flow through the storage choke is inverted at least once during a switching period of the electric switching elements; and wherein the DC-DC converter is configured to track or readjust a switching frequency of the electric switching elements in case of a change of operating parameters of the DC-DC converter such that a change of direction of the current flow through the storage choke during a switching period of the electric switching elements is ensured; and wherein the storage choke is dimensioned such that a minimum value of the current flow through the storage choke at a nominal switching frequency is so great that in case of a change of operating parameters of the DC-DC converter it is ensured for at least two subsequent switching periods of the electric switching elements without tracking the switching frequency of the electric switching elements that during the at least two switching periods the direction of the current flow through the storage choke of the electric switching elements is respectively inverted at least once.

Embodiments of the present invention provide a DC-DC converter having a first DC voltage gate, a second DC voltage gate and a storage choke. The storage choke is coupled between the first DC voltage gate and the second DC voltage gate by means of electric switching elements.

The DC-DC converter is configured such that a direction of a current flow through the storage choke is inverted at least once during a switching period of the electric switching elements. Further, the DC-DC converter is configured to track or readjust a switching frequency of the electric switching elements in case of a change of operating parameters of the DC-DC converter, such that a change of direction of the current flow through the storage choke during a switching period of the electric switching elements is ensured.

The present invention is based on the idea that losses of the DC-DC converter can be reduced by inverting a direction of a current flow through the storage choke at least once during a switching period of the electric switching elements (e.g. PWM period). Inverting the current flow through the storage choke can be used for recharging parasitic capacitances of the electric switching elements between the switching operations (e.g. to discharge them prior to switching on), whereby softer switching operations, i.e. switching operations with smaller voltage jumps can be realized. Since inverting the current flow through the storage choke depends on the operating parameters of the DC-DC converter, the DC-DC converter is additionally configured to track or readjust a switching frequency of the electric switching elements in case of a change of operating parameters of the DC-DC converter, such that a change of direction of the current flow through the storage choke during a switching period of the electric switching elements is ensured.

In some embodiments, the DC-DC converter can be configured to track or readjust the switching frequency of the electric switching elements such that a change of direction of the current flow through the storage choke is ensured and simultaneously a minimum value of the current flow through the storage choke is adjusted such that, on the one hand, zero voltage switching of the electric switching elements during a switching period of the electric switching elements (e.g. PWM period) is ensured and, on the other hand, current ripple of the current flow through the storage choke remains as low as possible.

Further embodiments relate to a method for operating a DC-DC converter. The DC-DC converter comprises a first DC voltage gate, a second DC voltage gate and a storage choke. The storage choke is coupled between the first direct voltage gate and the second direct voltage gate by means of electric switching elements. The DC-DC converter is configured such that a direction of a current flow through the storage choke is inverted at least once during a switching period of the electric switching elements. The method includes tracking or readjusting a switching frequency of the electric switching elements in case of a change of operating parameters of the DC-DC converter such that a change of direction of the current flow through the storage choke during a switching period of the electric switching elements is ensured.

Further embodiments provide a DC-DC converter comprising a first DC voltage gate, a second DC voltage gate and a storage choke. The storage choke is coupled between the first DC voltage gate and the second DC voltage gate by means of electric switching elements. A DC-DC converter is configured such that a direction of a current flow through the storage choke is inverted at least once during a switching period of the electric switching elements. Further, the DC-DC converter is configured to track or readjust a switching frequency of the electric switching elements in case of a change of operating parameters of the DC-DC converter such that a change of direction of the current flow through the storage choke during a switching period of the electric switching elements is ensured. Here, the storage choke is dimensioned such that a minimum value of the current flow through the storage choke at a nominal switching frequency is so great that in case of a change of operating parameters of the DC-DC converter it is ensured for at least two subsequent switching periods of the electric switching elements without tracking the switching frequency of the electric switching elements that during the at least two switching periods the direction of the current flow through the storage choke of the electric switching elements is respectively inverted at least once.

BRIEF DESCRIPTION OF THE DRAWINGS

Embodiments of the present invention will be detailed subsequently referring to the appended drawings, in which.

DETAILED DESCRIPTION

In the following description of embodiments of the invention, the same or equal elements are provided with the same reference numbers, such that the description is interchangeable in the different embodiments.

Figure 1:
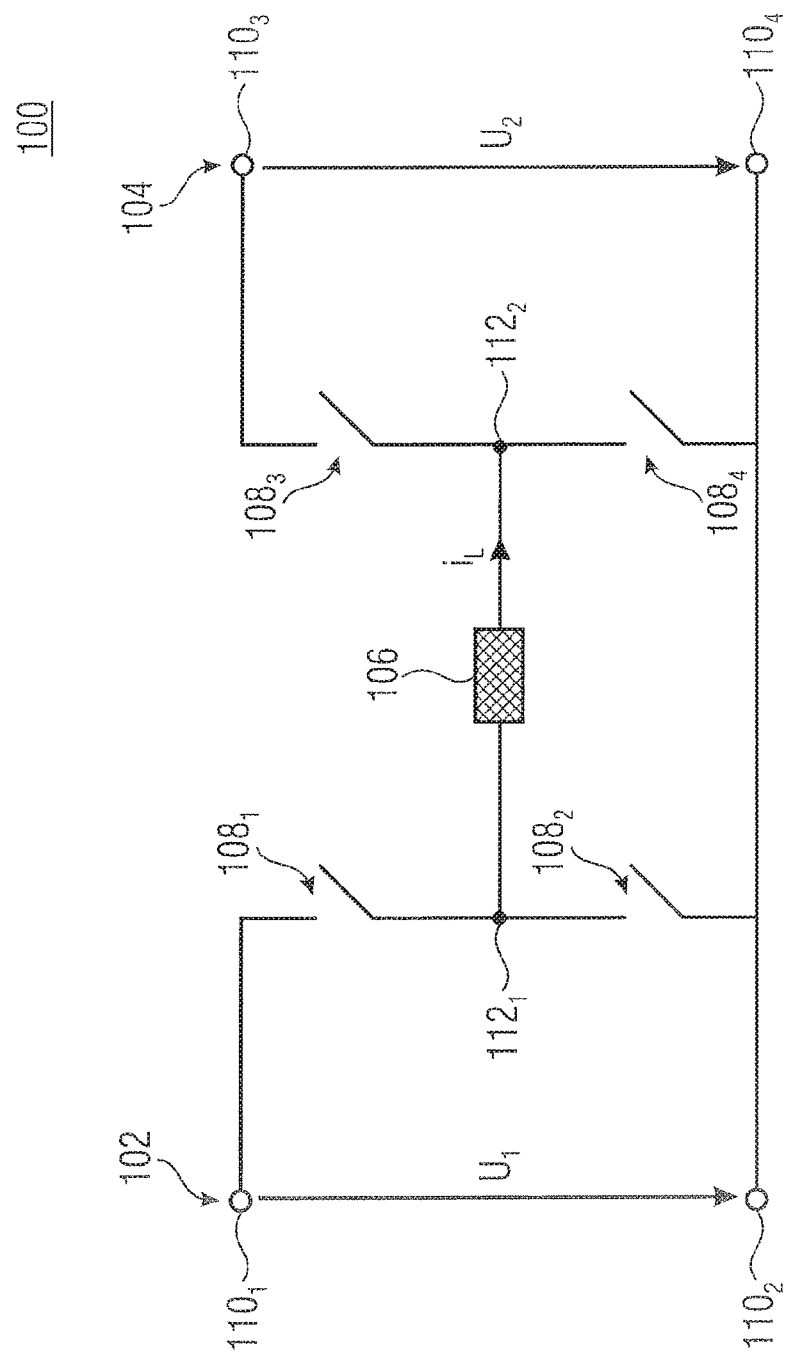
FIG. 1 shows a schematic block diagram of a DC-DC converter according to an embodiment.

FIG. 1 shows a schematic block diagram of a DC-DC converter 100 according to an embodiment. The DC-DC converter 100 comprises a first DC voltage gate 102, a second DC voltage gate 104 and a storage choke 106. The storage choke 106 is coupled between the first DC voltage gate 102 and the second DC voltage gate 104 by means of electric switching elements $108_1$ to $108_n$. The DC-DC converter 100 is configured such that a direction of a current flow $i_L$ through the storage choke 106 is inverted at least once during a switching period of the electric switching elements $108_1$ to $108_n$ (e.g. PWM period). The DC-DC converter 100 is configured to track or readjust a switching frequency of the electric switching elements $108_1$ to $108_n$ in case of a change of operating parameters of the DC-DC converter 100 such that a change of direction of the current flow $i_L$ through the storage choke 106 during a switching period of the electric switching elements $108_1$ to $108_n$ is ensured.

In embodiments, the DC-DC converter 100 is configured such that a direction of a current flow $i_L$ through the storage choke 106 is inverted at least once during a switching period of the electric switching elements $108_1$ to $108_n$ (e.g. PWM period). Inverting the current flow through the storage choke can be used for reloading parasitic capacitances of the electric switching elements $108_1$ to $108_n$ between the switching operations (e.g. for discharging parasitic capacitances of the electric switching elements $108_1$ to $108_n$ prior to switching on), whereby softer switching operations, i.e. switching operations with smaller voltage jumps can be realized. Since inverting the current flow $i_L$ through the storage choke 106 depends on the operating parameters of the DC-DC converter 100, the DC-DC converter 100 is configured to track or readjust a switching frequency of the electric switching elements $108_1$ to $108_n$ in case of a change of operating parameters of the DC-DC converter 100 such that a change of direction of the current flow $i_L$ through the storage choke 106 during a switching period of the electric switching elements $108_1$ to $108_n$ is ensured.

In some embodiments, the DC-DC converter can be configured to track or readjust the switching frequency of the electric switching elements $108_1$ to $108_n$ such that a change of direction of the current flow $i_L$ through the storage choke 106 is ensured and at the same time a minimum value of the current flow $i_L$ through the storage choke 106 is adjusted such that zero volt switching of the electric switching elements $108_1$ to $108_n$ during a switching period of the electric switching elements $108_1$ to $108_n$ (e.g. PWM period) is ensured and current ripple of the current flow through the storage choke 106 remains as small as possible.

In embodiments, the DC-DC converter 100 can be configured such that a direction of the current flow $i_L$ through the storage choke 106 is inverted (exactly) twice during a switching period of the electric switching elements $108_1$ to $108_n$ (e.g. PWM period).

Operating parameters of the DC-DC converter 100 can, for example, be voltages and currents at terminal pairs of the first and/or second DC voltage gate 102 and 104. The first DC voltage gate 102 can be connected, for example, to a voltage or current source while the second DC voltage gate 104 can be connected to a load, such that the operating parameters of the DC-DC converter 100 can be influenced by the voltage or current source or load.

As has already been mentioned, the storage choke 106 can be coupled between the first DC voltage gate 102 and the second DC voltage gate 104 by means of electric switching elements $108_1$ to $108_n$. The term "coupled" can be related to a direct electric connection or low-impedance connection such as a cable, a line or a conductive trace or to an indirect electric connection realized by means of at least one further active or passive electric device such as a resistor, a diode or an electric switch.

The DC-DC converter 100 can comprise up to n electric switching elements $108_1$ to $108_n$, wherein n is a natural number greater than or equal to two, n≥2.

As shown in FIG. 1, the DC-DC converter 100 can comprise, for example, four (n=4) electric switching elements $108_1$ to $108_4$, wherein a first electric switching element $108_1$ and a second electric switching element $108_2$ of the four electric switching elements $108_1$ to $108_4$ are connected in series between a first terminal $110_1$ and a second terminal $110_2$ of the first DC voltage gate 102 and wherein a third electric switching element $108_3$ and a fourth electric switching element $108_4$ of the four electric switching elements $108_1$ to $108_4$ are connected in series between a third terminal $110_3$ and a fourth terminal $110_4$ of the second DC voltage gate 104.

Here, the storage choke 106 can be connected in series between a first node $112_1$ and a second node $112_2$, wherein the first node $112_1$ can be connected in series between the first electric switching element $108_1$ and the second electric switching element $108_2$, and wherein the second node $112_2$ can be connected in series between the third electric switching element $108_3$ and the fourth electric switching element $108_4$.

Thus, the first dielectric switching element $108_1$ can be connected in series between the first terminal $110_1$ and the first node $112_1$, while the second electric switching element $108_2$ can be connected in series between the first node $112_1$ and the second terminal $112_2$. Accordingly, the third electric switching element $108_3$ can be connected in series between the third terminal $110_3$ and the second node $112_2$, while the fourth electric switching element $108_4$ can be connected in series between the second node $112_2$ and the fourth terminal $110_4$.

As can be seen in FIG. 1, a first voltage $u_1$ can be applied to the first DC voltage gate 102 while a second voltage $u_2$ can be applied to the second DC voltage gate 104. Here, the DC-DC converter 100 can be configured to provide the second voltage $u_2$ based on the first voltage, wherein the second voltage $u_2$ can be greater than, less than or equal to the first voltage $u_1$. Obviously, the DC-DC converter 100 can also be configured to provide the first voltage $u_1$ based on the second voltage $u_2$, wherein the first voltage $u_1$ can be greater than, less than or equal to the second voltage $u_2$.

Thus, the DC-DC converter 100 can be a bidirectional DC-DC converter. Further, the DC-DC converter 100 can be operated in the buck-boost mode. Further, the DC-DC converter 100 can also be operated in the buck mode and/or the boost mode. Above that, the DC-DC converter 100 can be switched between the buck mode, boost mode and buck-boost mode.

Figure 2:
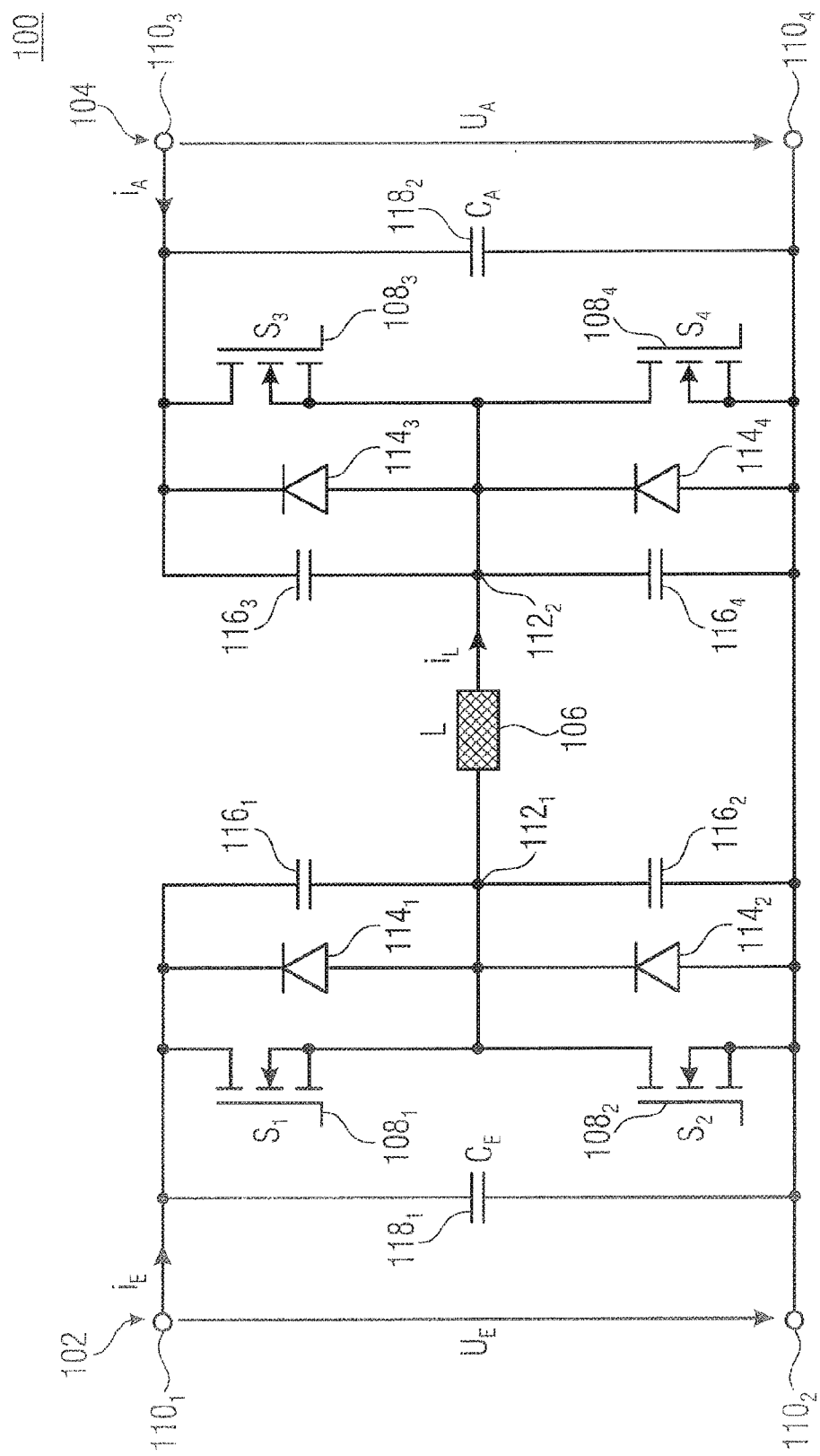
FIG. 2 shows a schematic block diagram of the DC-DC converter according to an embodiment.

FIG. 2 shows a schematic block diagram of the DC-DC converter 100 according to an embodiment. As can be seen in FIG. 2, the four electric switching elements $108_1$ to $108_4$ can be implemented by MOSFETs (MOSFET=metal oxide semiconductor field effect transistor). Obviously, the four electric switching elements $108_1$ to $108_4$ can also be implemented by other controllable electric switching elements, such as bipolar transistors or IGBTs (IGBT=insulated-gate bipolar transistor).

Further, the DC-DC converter 100 can comprise four diodes (freewheeling diodes) $114_1$ to $114_4$ which are connected anti-parallel to the four electric switching elements $108_1$ to $108_4$.

A first diode $114_1$ of the four diodes $114_1$ to $114_4$, for example, can be connected in parallel to the first electric switching element $108_1$, such that a cathode of the first diode $114_1$ is connected to the first terminal $110_1$, while an anode of the first diode $114_1$ is connected to the first node $112_1$. The second diode $114_2$ of the four diodes $114_2$ to $114_4$ can be connected in parallel to the second electric switching element $108_2$, such that a cathode of the second diode $114_2$ is connected to the first node $112_1$, while an anode of the second diode $114_2$ is connected to the second terminal $110_2$. A third diode $114_3$ of the four diodes $114_1$ to $114_4$ can be connected in parallel to the third electric switching element $108_3$, such that a cathode of the third diode $114_3$ is connected to the third terminal $110_3$, while an anode of the third diode $114_3$ is connected to the second node $112_2$. A fourth diode $114_4$ of the four diodes $114_1$ to $114_4$ can be connected in parallel to the fourth electric switching element $108_4$, such that a cathode of the fourth diode $114_4$ is connected to the second node $112_2$, while an anode of the fourth diode $114_4$ is connected to the fourth terminal $110_4$.

Further, the DC-DC converter 100 can comprise a first capacitance $118_1$ (e.g. a first capacitor) and a second capacitance $118_2$ (e.g. a second capacitor), wherein the first capacitance $118_1$ can be connected in series between the first terminal $110_1$ and the second terminal $110_2$, and wherein the second capacitance $118_2$ can be connected in series between the third terminal $110_3$ and the fourth terminal $110_4$.

Above that, the schematic block diagram of the DC-DC converter 100 shown in FIG. 2 comprises four capacitances $116_1$ to $116_4$ which are to represent the parasitic capacitances of the four electric switching elements $108_1$ to $108_4$. The four capacitances $116_1$ to $116_4$ can also be externally connected capacitors, such as snubber capacitors.

In the following, it is assumed that the first DC voltage gate 102 is a DC voltage input gate and that the second DC voltage gate 104 is a DC voltage output gate.

Accordingly, the first voltage $u_1$ applied to the first DC voltage gate 102 can be an input voltage $u_E$, while the second voltage $u_2$ applied to the second DC voltage gate 104 can be an output voltage $u_A$. Further, the first capacitance $118_1$ can be an input capacitance $C_E$ while the second capacitance $108_2$ can be an output capacitance $C_A$.

In other words, FIG. 2 shows the topology of the bidirectional buck-boost converter 100 or the DC-DC converter 100 which can be configured as bidirectional (cascaded) buck-boost converter 100. The electric switching elements (switches) $108_1$ ($S_1$) to $108_4$ ($S_4$) can be realized by power semiconductors (e.g. MOSFETs or IGBTs with diode connected antiparallel). In the following description it is assumed, without losing generality, that the electric switching elements (switches) $108_1$ ($S_1$) to $108_4$ ($S_4$) are considered as MOSFETs and the energy is transmitted from left to right, i.e. from DC voltage input gate 102 to DC voltage output gate 104.

As has already been mentioned, switching losses of the DC-DC converter 100 can be reduced by configuring, on the one hand, the DC-DC converter 100 such that a direction of a current flow $i_L$ through the storage choke 106 is inverted at least once during a switching period of the electric switching elements $108_1$ to $108_n$ (e.g. PWM period) and that, on the other hand, the switching frequency of the electric switching elements $108_1$ to $108_4$ is tracked or readjusted such that a change of direction of the current flow $i_L$ through the storage choke 106 during a switching period of the electric switching elements $108_1$ to $108_n$ (e.g. PWM period) is ensured. Herein, this concept is referred to as resonant (switching) loss reduction with frequency modulation (concept 1).

In the following, the concept for resonant (switching) loss reduction without transition phase and with frequency modulation (concept 1) will be described in detail.

The DC-DC converter 100 can be configured to (periodically) switch, in a buck-boost mode of the DC-DC converter 100, between a first switching state in which the first electric switching element $108_1$ and the fourth electric switching element $108_4$ are switched on (and the second electric switching element $108_2$ and the third electric switching element $108_3$ are switched off) and a second switching state in which the second electric switching element $108_2$ and the third electric switching element $108_3$ are switched on (and the first electric switching element $108_1$ and the fourth electric switching element $108_4$ are switched off).

Here, the DC-DC converter 100 can be configured to switch between the first switching state and the second switching state such that switching between the first switching state and the second switching state and switching between the second switching state and the first switching state comprise a dead time where the electric switching elements $108_1$ to $108_4$ are switched off.

In other words, in the control method without transition phase, the electric switching elements (switches) $108_1$ ($S_1$) and $108_4$ ($S_4$) can be switched on or off continuously in a complementary manner to the electric switching elements (switches) $108_2$ ($S_2$) and $108_3$ ($S_3$). For preventing a short-circuit both at the DC voltage input gate (input) 102 and at the DC voltage output gate (output) 104 of the DC-DC converter (converter) 100 a dead time can be provided between switching on and switching off the electric switching elements (power semiconductors) $108_1$ to $108_4$.

Thus, according to the mode of operation, the DC-DC converter (buck-boost converter) 100 basically comprises two states within a switching period of the electric switching elements $108_1$ to $108_n$ (e.g. PWM period) (PWM=pulse width modulation)). Either, the electric switching elements $108_1$ ($S_1$) and $108_4$ ($S_4$) are switched on simultaneously, while the electric switching elements $108_2$ ($S_2$) and $108_3$ ($S_3$) are switched off simultaneously (first switching state) or vice versa (second switching state). This results in two advantages.

One advantage is that the output voltage $u_A$ of the DC-DC converter 100 can be continuously adjusted from zero to infinity via the duty cycle of a pair of complementary PWM signals. This means that the DC-DC converter 100 can be operated in the same mode—buck-boost mode. For that reason the system (e.g. DC-DC converter 100 connected to a current/voltage source and load) prevents the reliability problems caused during the transition phases between different operating modes of voltage and current jumps. A further advantage is that the system, as regards to control technology, turns into a stable controlled system. Thus, the effort for control unit design can be significantly reduced. In contrast, in conventional buck and boost converters, instable controlled systems result due to conjugate complex pole pairs.

These advantages can be directly inferred from the state space model of the DC-DC converter 100 as will be discussed below with reference to FIGS. 3a and 3b.

Figure 3A:
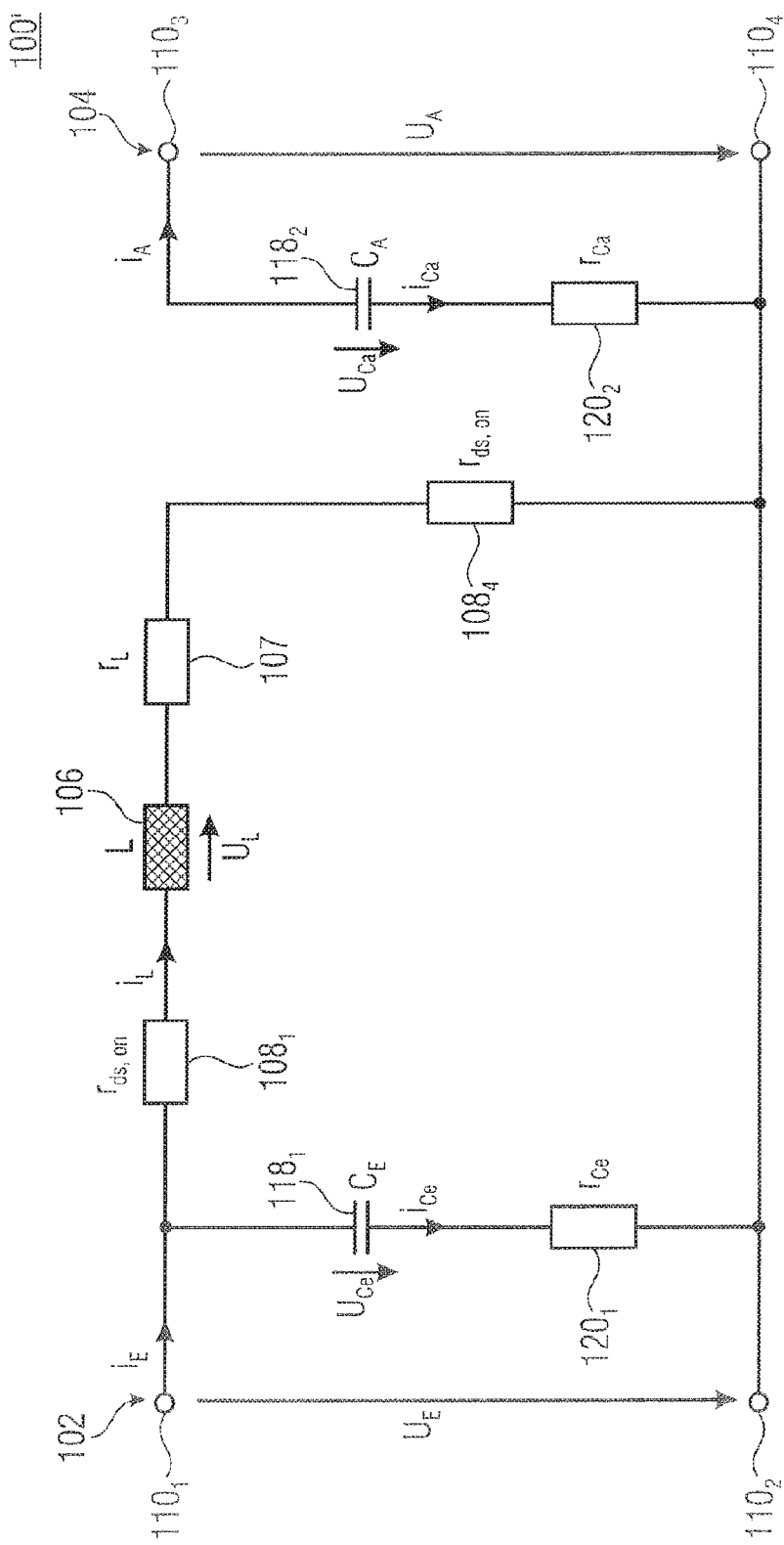
FIG. 3a shows in a schematic block diagram an equivalent circuit of the DC-DC converter in a first switching state.

FIG. 3a shows in a schematic block diagram an equivalent circuit 100' of the DC-DC converter (buck-boost converter) 100 in a first switching state, wherein the first electric switching element $108_1$ and the fourth electric switching element $108_4$ are switched on and the second electric switching element $108_2$ and the third electric switching element $108_3$ are switched off.

Accordingly, the equivalent circuit of the DC-DC converter 100 comprises the storage choke 106 (L), a parasitic resistance 107 ($r_L$) of the storage choke, a channel resistance (drain source resistance) $r_{ds,on}$ of the switched on first electric switching element $108_1$, a channel resistance (drain source resistance) $r_{ds,on}$ of the switched on fourth electric switching element $108_4$, the input capacitance $118_1$ ($C_E$), a parasitic resistance $120_1$ ($r_{Ce}$) of the input capacitance, the output capacitance $118_2$ ($C_A$), and a parasitic resistance $120_2$ ($r_{Ca}$) of the output capacitance.

Here, the channel resistance $r_{ds,on}$ of the switched on first electric switching elements $108_1$, the storage choke 106 (L), the parasitic resistance $r_L$ of the storage choke 106 and the channel resistance $r_{ds,on}$ of the switched on fourth electric switching element $108_4$ are connected in series between the first terminal $110_1$ and the fourth terminal $110_4$, while the input capacitance $118_1$ ($C_E$) and the parasitic resistance $120_1$ ($r_{Ce}$) of the input capacitance are connected in series between the first terminal $110_1$ and the second terminal $110_2$, and while the output capacitance $118_2$ ($C_A$) and the parasitic resistance $120_2$ ($r_{Ca}$) of the output capacitance are connected in series between a third terminal $110_3$ and the fourth terminal $110_4$.

In other words, FIG. 3a shows the equivalent circuit 100' of the DC-DC converter 100 in the situation where the electric switching elements $108_1$ ($S_1$) and $108_4$ ($S_4$) are switched on and the electric switching elements $108_2$ ($S_2$)

and 108₃ (S₃) are switched off. On the left side of the circuit 100', the storage choke (coil) 106 is charged by the input capacitance and possibly an additional energy source at the switching input 118₁ (C_E). Accordingly, the current i_L in the storage choke 106 increases. On the right side, a load that can be connected to the DC voltage output gate 102 is fed by the output capacitor 118₂ (C_A). The energy content of the output capacitor 118₂ (C_A) decreases.

Figure 3B:
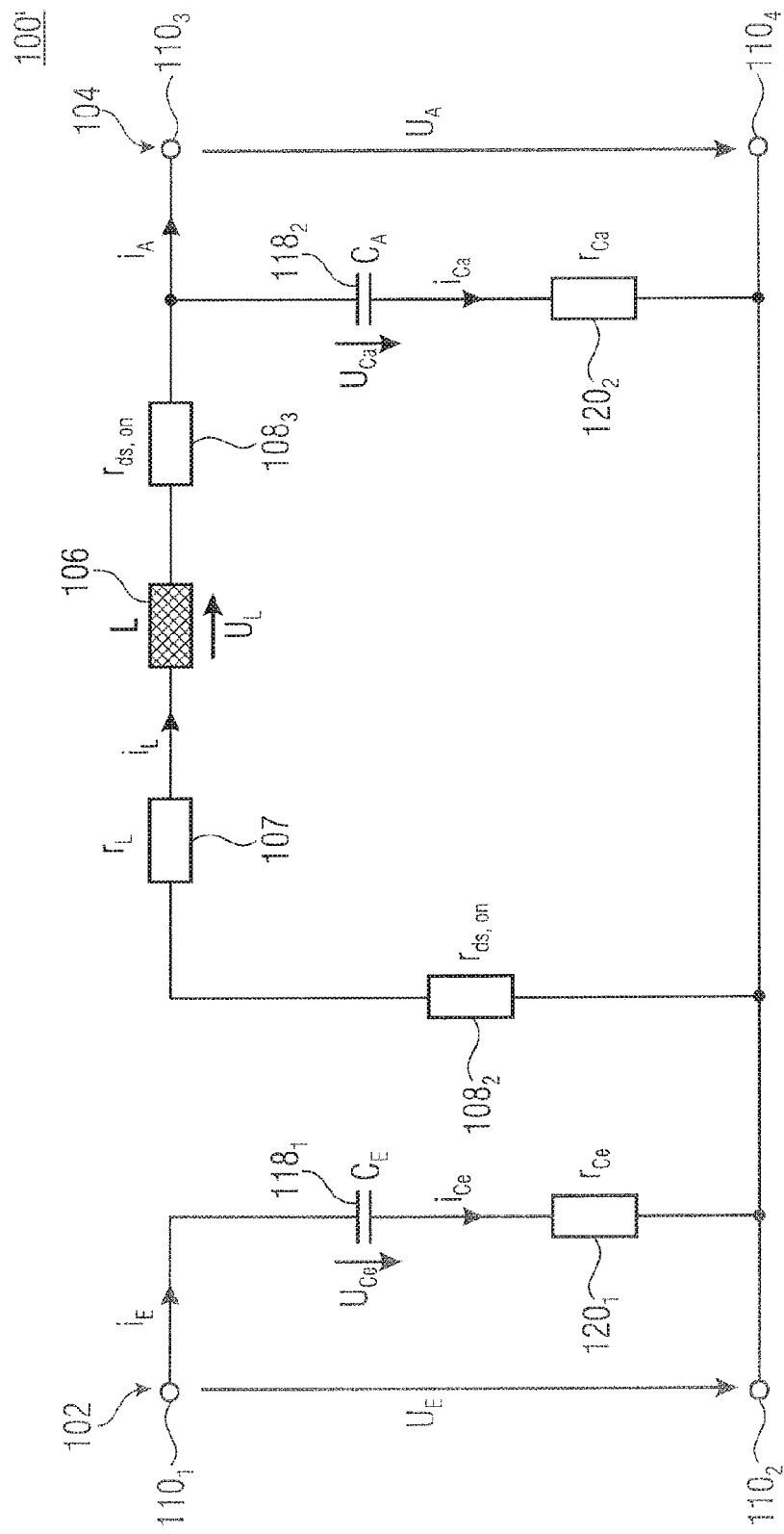
FIG. 3b shows in a schematic block diagram an equivalent circuit of the DC-DC converter in a second switching state.

FIG. 3b shows, in a schematic block diagram an equivalent circuit 100' of the DC-DC converter (buck-boost converter) 100 in the second switching state, wherein the second electric switching element 108₂ and the third electric switching element 108₃ are switched on and the first switching element 108₁ and the fourth electric switching elements 108₄ are switched off.

Accordingly, the equivalent circuit 100' of the DC-DC converter 100 comprises the storage choke 106 (L), the parasitic resistance 107 (r_L) of the storage choke, a channel resistance (drain source resistance) $r_{ds,on}$ of the switched on second electric switching element 108₂, a channel resistance (drain source resistance) $r_{ds,on}$ of the switched on third electric switching element 108₃, the input capacitance 118₁ (C_E), the parasitic resistance 120₁ (r_Ce) of the input capacitance, the output capacitance 118₂ (C_A) and the parasitic resistance 120₂ (r_Ca) of the output capacitance.

Here, the channel resistance $r_{ds,on}$ of the switched on second electric switching element 108₂, the storage choke 106 (L), the parasitic resistance r_L of the storage choke 106 and the channel resistance $r_{ds,on}$ of the switched on third electric switching element 108₃ are connected in series between the second terminal 110₂ and the third terminal 110₃, while the input capacitance 118₁ (C_E) and the parasitic resistance 120₁ (r_CE) of the input capacitance are connected in series between the first terminal 110₁ and the second terminal 110₂, and while the output capacitance 118₂ (C_A) and the parasitic resistance 120₂ (r_Ca) of the output capacitance are connected in series between the third terminal 110₃ and the fourth terminal 110₄.

In other words, FIG. 3b shows the equivalent circuit 100' of the buck-boost converter 100 in the situation where the electric switching elements 108₂ (S₂) and 108₃ (S₃) are switched on and the electric switching elements 108₁ (S₁) and 108₄ (S₄) are switched off. In that state, the energy stored in the storage choke 106 is further emitted to the load that can be connected to the DC voltage output gate 104 and the output capacitor 118₂ (C_A). The parasitic resistances of the electric switching elements (power semiconductors) $r_{ds,on}$ of the storage choke r_L and the capacitors r_ce and r_ca are considered during modeling.

By using the so-called state-space-averaging method according to the following definition:

$$\text{state variables: } x = \begin{pmatrix} x_1 \\ x_2 \\ x_3 \end{pmatrix} = \begin{pmatrix} u_{Ce} \\ u_{Ca} \\ i_L \end{pmatrix} \quad \text{(EQ. 1-1)}$$

$$\text{actuating variable: } u = d(\text{duty cycle}) \quad \text{(EQ. 1-2)}$$

$$\text{disturbance variables: } p = \begin{pmatrix} p_1 \\ p_2 \end{pmatrix} = \begin{pmatrix} u_E \\ u_A \end{pmatrix} \quad \text{(EQ. 1-3)}$$

$$\text{output variable: } y = i_E \quad \text{(EQ. 1-4)}$$

the state space model of the DC-DC converter 100 can be derived in the concept for resonant (switching) loss reduction without transition phase and with frequency modulation:

$$\begin{pmatrix} \dot{x}_1 \\ \dot{x}_2 \\ \dot{x}_3 \end{pmatrix} = \begin{pmatrix} -\frac{1}{r_{Ce} \cdot C_E} & 0 & 0 \\ 0 & -\frac{1}{r_{Ca} \cdot C_A} & 0 \\ 0 & 0 & -\frac{2 \cdot r_{ds,on} + r_L}{L} \end{pmatrix} \begin{pmatrix} x_1 \\ x_2 \\ x_3 \end{pmatrix} + \quad \text{(EQ. 1-5)}$$

$$\begin{pmatrix} \frac{1}{r_{Ce} \cdot C_E} & 0 \\ 0 & \frac{1}{r_{Ca} \cdot C_A} \\ \frac{1}{L} \cdot u & -\frac{1}{L} \cdot (1-u) \end{pmatrix}$$

$$y = \begin{pmatrix} -\frac{1}{r_{Ce}} & 0 & u \end{pmatrix} \begin{pmatrix} x_1 \\ x_2 \\ x_3 \end{pmatrix} + \begin{pmatrix} \frac{1}{r_{Ce}} & 0 \end{pmatrix} \begin{pmatrix} p_1 \\ p_2 \end{pmatrix} \quad \text{(EQ. 1-6)}$$

The states within the dead time are neglected. It results from (EQ. 1-5) that the system matrix of the model has three real negative poles $$-\frac{1}{r_{Ce} \cdot C_E},$$

$$-\frac{1}{r_{Ca} \cdot C_A}$$

and $$-\frac{2 r_{ds,on} + r_L}{L}.$$

Thus, the open system of the DC-DC converter 100 is a stable controlled system. Above that, in the stationary state, for $\dot{x}_1 = \dot{x}_2 = \dot{x}_3 = 0$, the mathematic connection between the input voltage U_E and the output voltage U_A is to be described approximately by (EQ. 1-7):

$$\frac{U_A}{U_E} = \frac{D}{1-D} \quad \text{(EQ. 1-7)}$$

Here, D is the duty cycle (actuating variable) in the stationary state. Therefrom, it can be inferred that the output voltage U_A of the buck-boost converter 100 can be continuously regulated from zero to infinity by adjusting the duty cycle D.

However, the above-described operating mode of the electric switching elements (switches) 108₁ to 108₄ results in decreased conversion efficiency compared to conventional buck or boost converters. On the one hand, four switches 108₁ to 108₄ are clocked simultaneously and this causes higher switching losses. On the other hand, the current i_L through the storage choke 106 increases in the buck-boost converter 100. Accordingly, the conduction losses both in the electric switching elements (switches) 108₁ to 108₄ and in the storage choke 106 are increased, which reduces the efficiency of the DC-DC converter 100.

This disadvantage can be prevented in the ZVS reduced operation of the electric switching elements (semiconductor switches) 108₁ to 108₄ (ZVS=zero voltage switching).

In embodiments, an inductance L of the storage choke 106 can be dimensioned such that the direction of a current flow i_L through the storage choke 106 is inverted at least once during a switching period of the electric switching elements $108_1$ to $108_4$ (e.g. PWM period).

Further, the inductance L of the storage choke 106 can be dimensioned such that a current ripple of the current flow $i_L$ through the storage choke 106 is so great that a direction of a current flow $i_L$ through the storage choke 106 is inverted at least once during a switching period of the electric switching elements $108_1$ to $108_4$ (e.g. PWM period).

Further, the inductance L of the storage choke 106 can be dimensioned such that due to the current flow $i_L$ through the storage choke 106 parasitic capacitances $116_1$ to $116_4$ of electric switching elements $108_1$ to $108_4$ to be switched on are discharged prior to switching on and/or that due to the current flow $i_L$ through the storage choke 106 parasitic capacitances $116_1$ to $116_4$ of previously switched on electric switching elements $108_1$ to $108_4$ are charged.

Thus, the inductance L of the storage choke 106 can be dimensioned such that during a dead time of the DC-DC converter 100, during which the switching elements $108_1$ to $108_4$ are switched off, parasitic capacitances $116_1$ to $116_4$ of the switching elements $108_1$ to $108_4$ that are switched on after the dead time are discharged by the current flow $i_L$ through the storage choke 106, and/or parasitic capacitances $116_1$ to $116_4$ of the electric switching elements $108_1$ to $108_4$ that had been switched on prior to the dead time are charged by the current flow $i_L$ through the storage choke 106.

Thus, in the ZVS reduced operation of the electric switching elements (switches) $108_1$ to $108_4$ the current $i_L$ in the storage choke (inductance) 106 is inverted twice within a switching period of the electric switching elements $108_1$ to $108_4$ (e.g. PWM period) by a respective design of the storage choke 106. This has the effect that the parasitic capacitors $116_1$ to $116_4$ of the electric switching elements (e.g. power semiconductors) $108_1$ to $108_4$ can be discharged of the storage choke current $i_L$ prior to their switching on between the dead time. In that way, the electric switching elements $108_1$ to $108_4$ can be (continuously) switched in a soft manner (ZVS). Thereby, switching losses can be reduced (or even minimized).

In other words, for minimizing power losses, the electric switching elements $108_1$ ($S_1$) to $108_4$ ($S_4$) can be operated in a ZVS reduced manner by a respective design of the storage choke 106. When designing the storage choke 106, two boundary conditions can be considered. One boundary condition is that the value of the inductance is so small that the current $i_L$ in the storage choke 106 can be inverted twice within a switching period of the electric switching elements $108_1$ to $108_4$ (e.g. PWM period). This has the effect that for example the parasitic capacitance $116_1$ of the first electric switching element $108_1$ ($S_1$) is discharged of the storage choke current $i_L$ prior to switching on and the parasitic capacitance $116_2$ of the second electric switching element $108_2$ ($S_2$) is charged. Thus, the switching losses can be reduced (or even minimized). However, the core losses of the storage choke 106 increase due to the increase of the current ripple. According to the other boundary condition, cores having a smaller permeability are to be selected for compensating the increasing core losses.

FIGS. 4a to 4h show in diagrams control signal, current and voltage curves of the DC-DC converter 100 across a switching period of the electric switching elements $108_1$ to $108_4$ (e.g. PWM period) as well as in schematic block diagrams switching and current flow states of the DC-DC converter 100 during different time intervals of the switching period of the electric switching elements $108_1$ to $108_4$ (e.g. PWM period).

In detail, FIGS. 4a to 4h show in a first diagram 10 a curve of a first control signal 140 of the first and fourth electric switching elements $108_1$ and $108_4$ and a curve of a second control signal 142 of the second and third electric switching elements $108_2$ and $108_3$ in a second diagram 12 a curve of a voltage drop 144 (drain source voltage $U_{DS1}$) across the first electric switching element $108_1$ and a curve of a voltage drop 146 (drain source voltage $u_{DS2}$) across the second electric switching element $108_2$ and in a third diagram 14 a curve of the current flow 148 ($i_L$) through the storage choke 106.

Figure 4A:
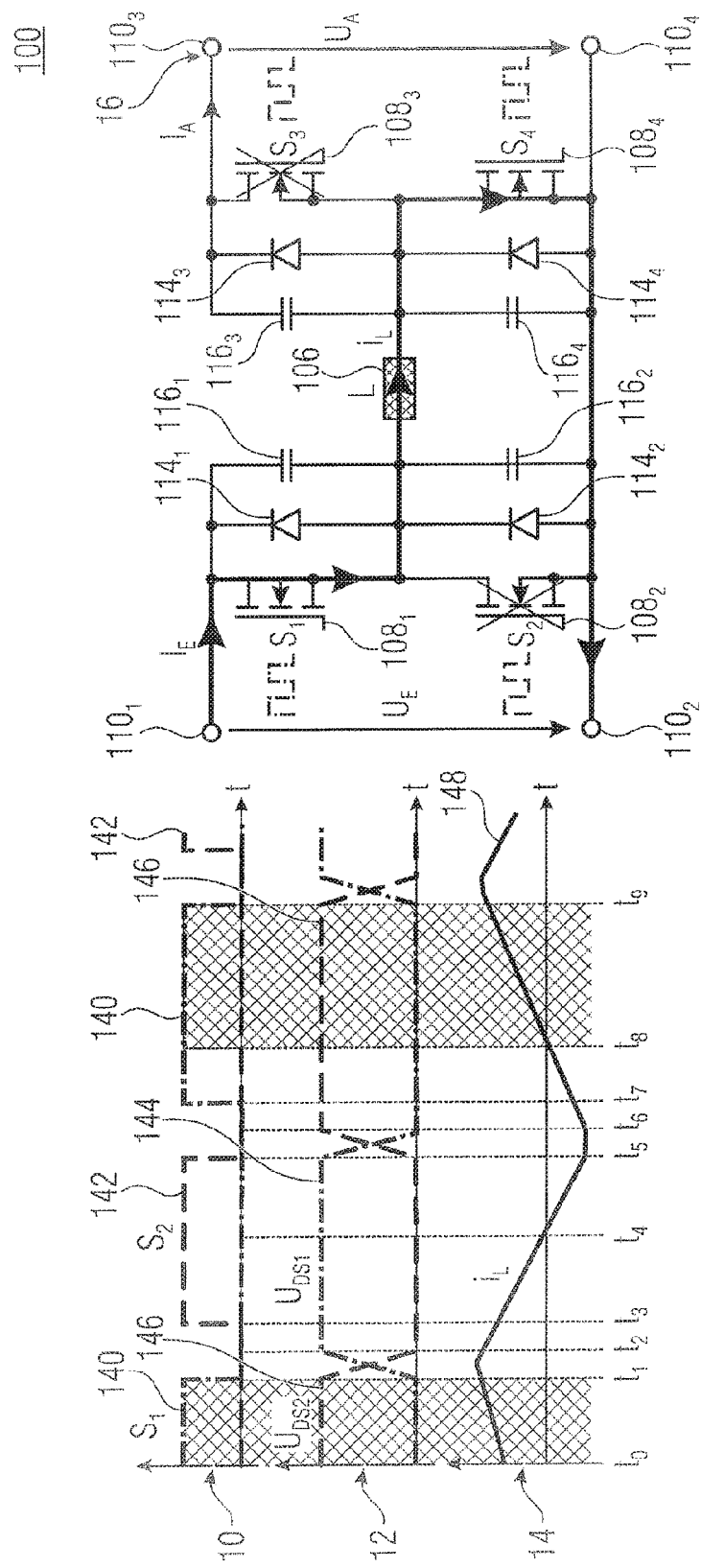
FIG. 4a shows in diagrams control signal, current and voltage curves of the DC-DC converter across a switching period of the electric switching elements (e.g. PWM) as well as in a schematic block diagram a switching and current flow state during a first time interval of the switching period of the electric switching elements (e.g. PWM period)

Here, FIG. 4a shows in a schematic block diagram 16 the current flow in the DC-DC converter 100 between the times $t_0$ and $t_1$ (during a first time interval of the switching period of the electric switching elements $108_1$ to $108_4$ (e.g. PWM period)). Between the times $t_0$ and $t_1$, the DC-DC converter 100 is in the first switching state, i.e., the first electric switching element $108_1$ and the fourth electric switching element $108_4$ are switched on while the second electric switching element $108_2$ and the third electric switching element $108_3$ are switched off. This results in a first current flow state in which the current in the DC-DC converter 100 flows from the first terminal $110_1$ via the first electric switching element $108_1$, the storage choke 106 and the fourth electric switching element $108_4$ to the second terminal $110_2$. In other words, FIG. 4a shows a first state of the current flow during a switching period of the electric switching elements $108_1$ to $108_4$ (e.g. PWM period).

Figure 4B:
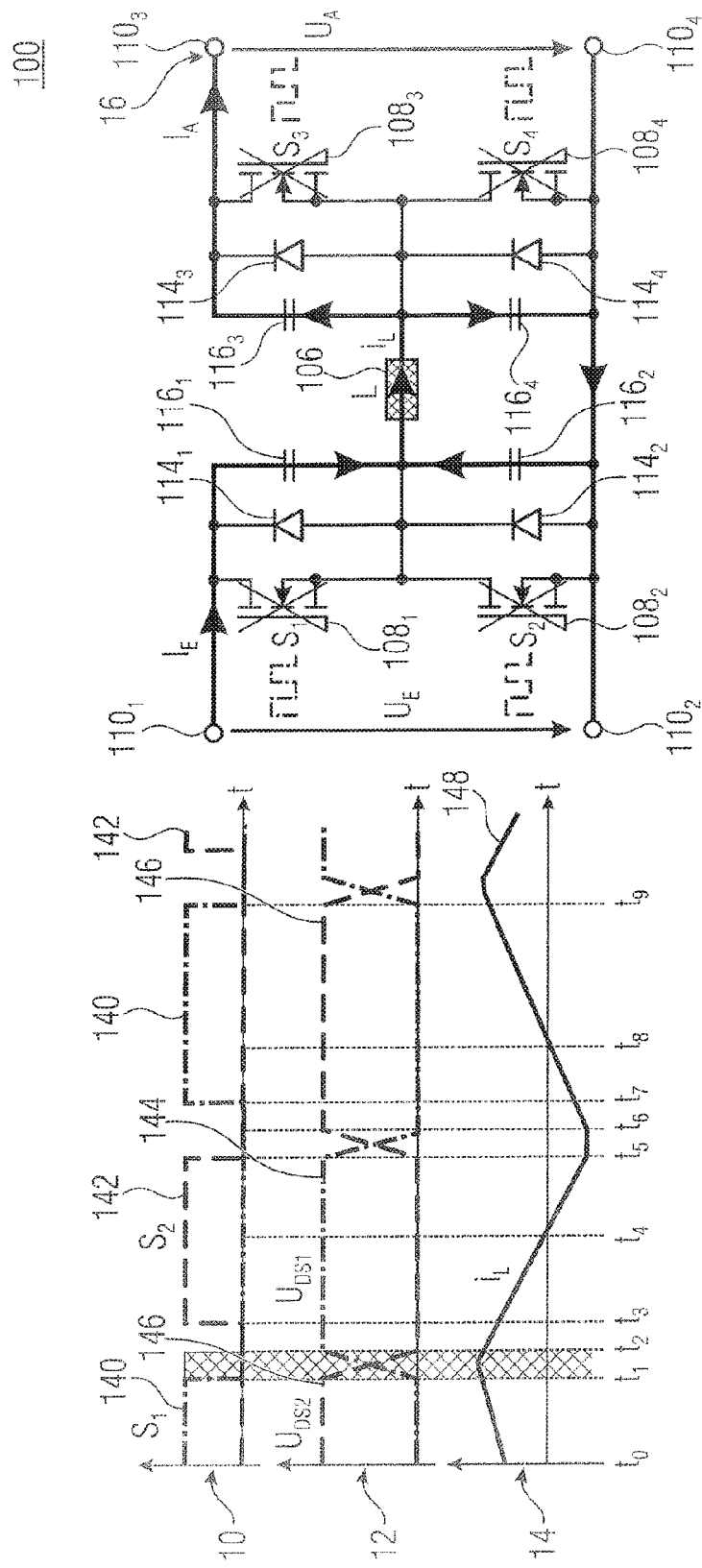
FIG. 4b shows in diagrams the control signal, current and voltage curves of the DC-DC converter across the switching period of the electric switching elements (e.g. PWM) as well as in a schematic block diagram a switching and current flow state during a second time interval of the switching period of the electric switching elements (e.g. PWM period)

FIG. 4b shows in a schematic block diagram 16 the current flow in the DC-DC converter 100 between the times t1 and t2 (during a second time interval of the switching period of the electric switching elements $108_1$ to $108_4$ (e.g. PWM period)). Between the times $t_1$ and $t_2$, the DC-DC converter 100 is in a dead time switching state, i.e., the first, second, third and fourth electric switching elements $108_1$ to $108_4$ are switched off. The current flow through the storage choke 106 cannot suddenly change, such that the storage choke 106 affects a continued flow of the current $i_L$. As shown in FIG. 4b, this results in a second current flow state in which parasitic capacitances of previously switched on switching elements, i.e., the parasitic capacitances $116_1$ and $116_4$ of the first and fourth electric switching elements $108_1$ and $108_4$ are charged by the current flow $i_L$ through the storage choke 106, and wherein the parasitic capacitances of switching elements to be switched on, i.e., the parasitic capacitances $116_2$ and $116_3$ of the second and third electric switching elements $108_2$ and $108_3$ are discharged prior to switching on. In other words, FIG. 4b shows a second state of the current flow during a switching period of the electric switching elements $108_1$ to $108_4$ (e.g. PWM period).

Figure 4C:
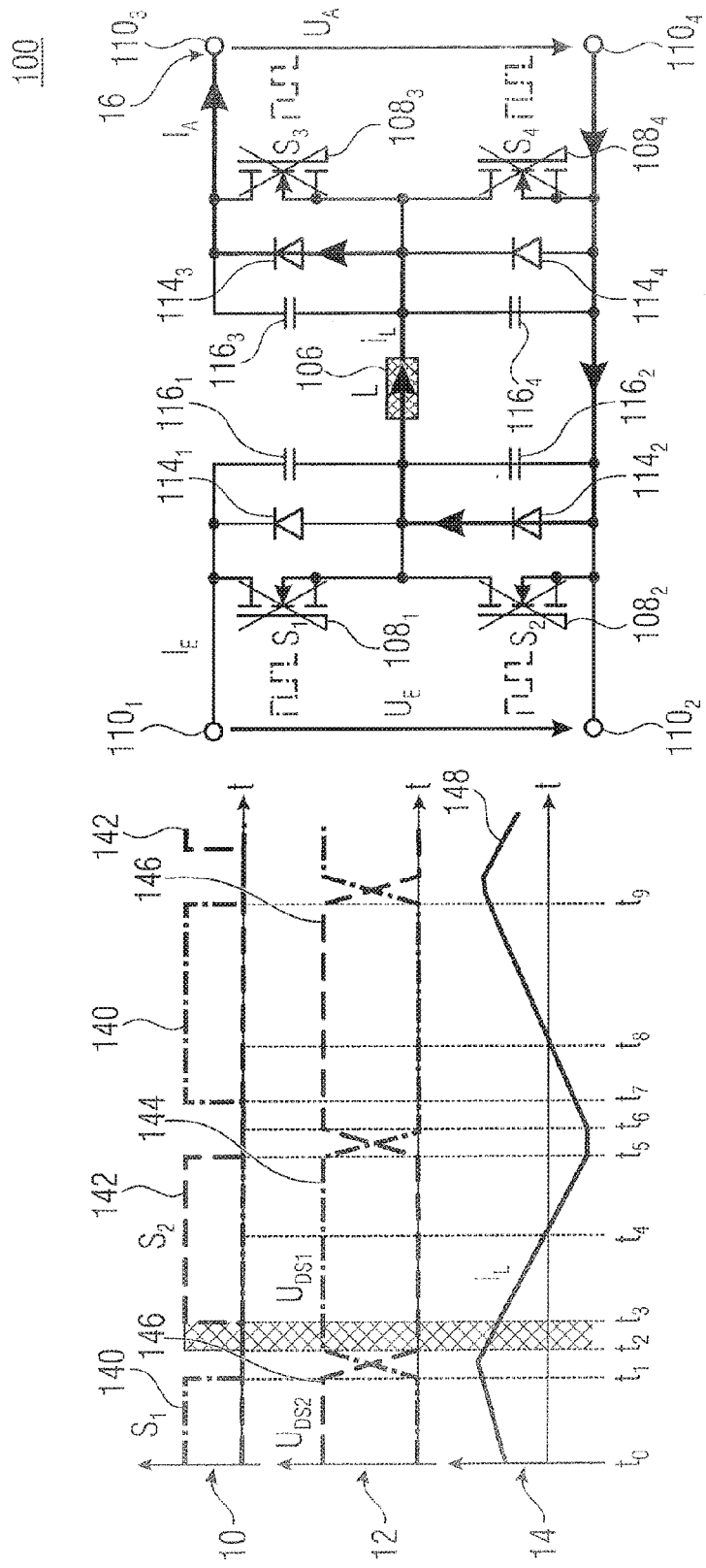
FIG. 4c shows in diagrams the control signal, current and voltage curves of the DC-DC converter across the switching period of the electric switching elements (e.g. PWM) as well as in a schematic block diagram a switching and current flow state during a third time interval of the switching period of the electric switching elements (e.g. PWM period)

FIG. 4c shows in a schematic block diagram 16 the current flow in the DC-DC converter 100 between the times t2 and t3 (during a third time interval of the switching period of the electric switching elements $108_1$ to $108_4$) (e.g. PWM period)). Between the times $t_2$ and $t_3$, the DC-DC converter 100 is still in the dead time switching state. Since at the time $t_2$ the parasitic capacitances of the previously switched on switching elements are (completely) charged, as well as the parasitic capacitances of switching elements to be switched on are (completely) discharged and the storage choke 106 still effects continued flow of the current $i_L$, a third switching state results between the times $t_2$ and $t_3$ in which the current in the DC-DC converter 100 flows from the fourth terminal $110_4$ via the second diode $114_2$, the storage choke 106 and third diode $114_3$ to the third terminal $110_3$. In other words, FIG. 4c shows a third state of the current flow during a switching period of the electric switching elements $108_1$ to $108_4$ (e.g. PWM period).

Figure 4D:
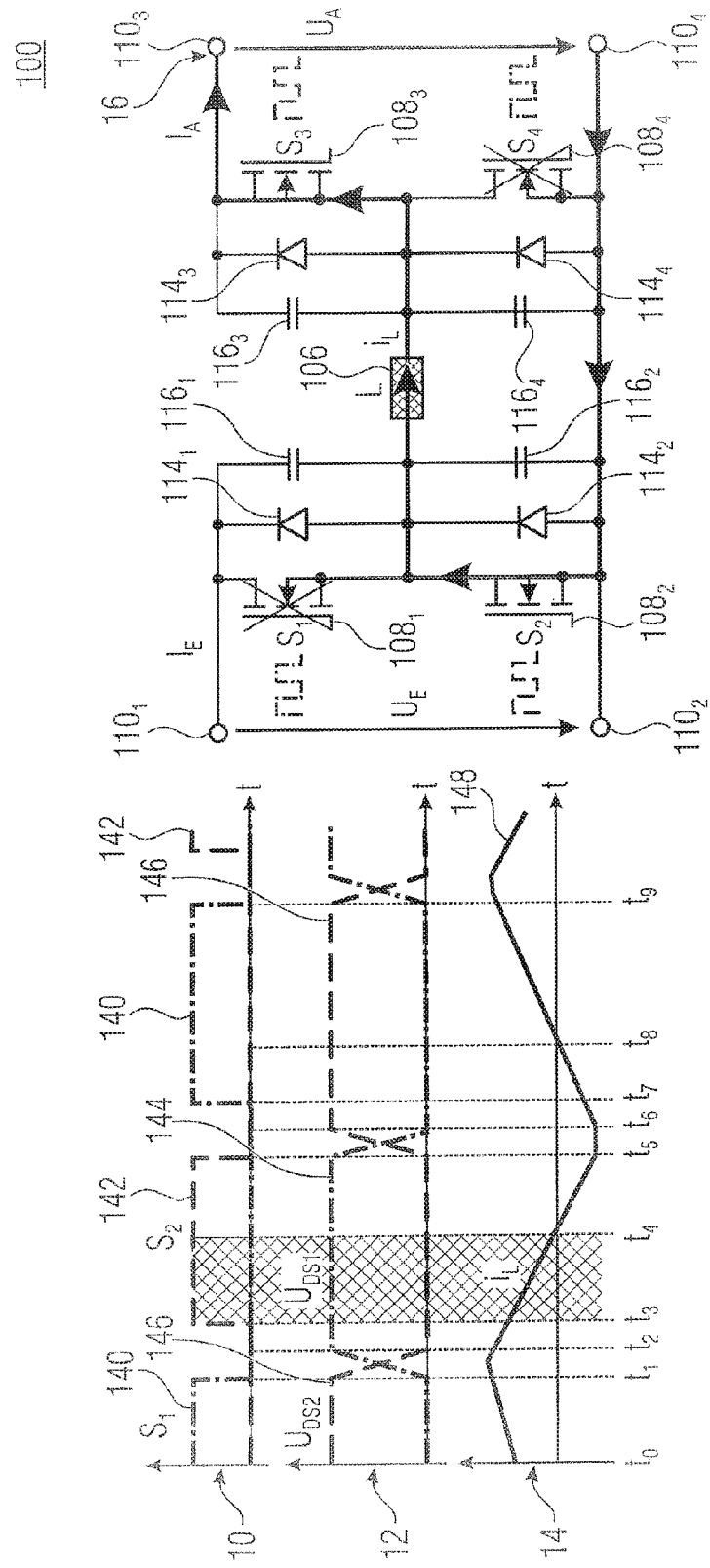
FIG. 4d shows in diagrams the control signal, current and voltage curves of the DC-DC converter across the switching period of the electric switching elements (e.g. PWM) as well as in a schematic block diagram a switching and current flow state during a fourth time interval of the switching period of the electric switching elements (e.g. PWM period)

FIG. 4d shows in a schematic block diagram 16 the current flow in the DC-DC converter 100 between the times $t_3$ and $t_4$ (during a fourth time interval of the switching period of the electric switching elements $108_1$ to $108_4$ (e.g. PWM period)). Between the times $t_3$ and $t_4$, the DC-DC converter 100 is in the second switching state, i.e., the second electric switching element $108_2$ and the third electric switching element $108_3$ are switched on, while the first electric switching element $108_1$ and the fourth electric switching element $108_4$ are switched off. This results in a fourth current flow state in which the current in the DC-DC converter 100 flows from the fourth terminal $110_4$ via the second electric switching element $108_2$, the storage choke 106 and the third electric switching element $108_3$ to the third terminal $110_3$. In other words, FIG. 4d shows a fourth state of the current flow during a switching period of the electric switching element $108_1$ to $108_4$ (e.g. PWM period).

Figure 4E:
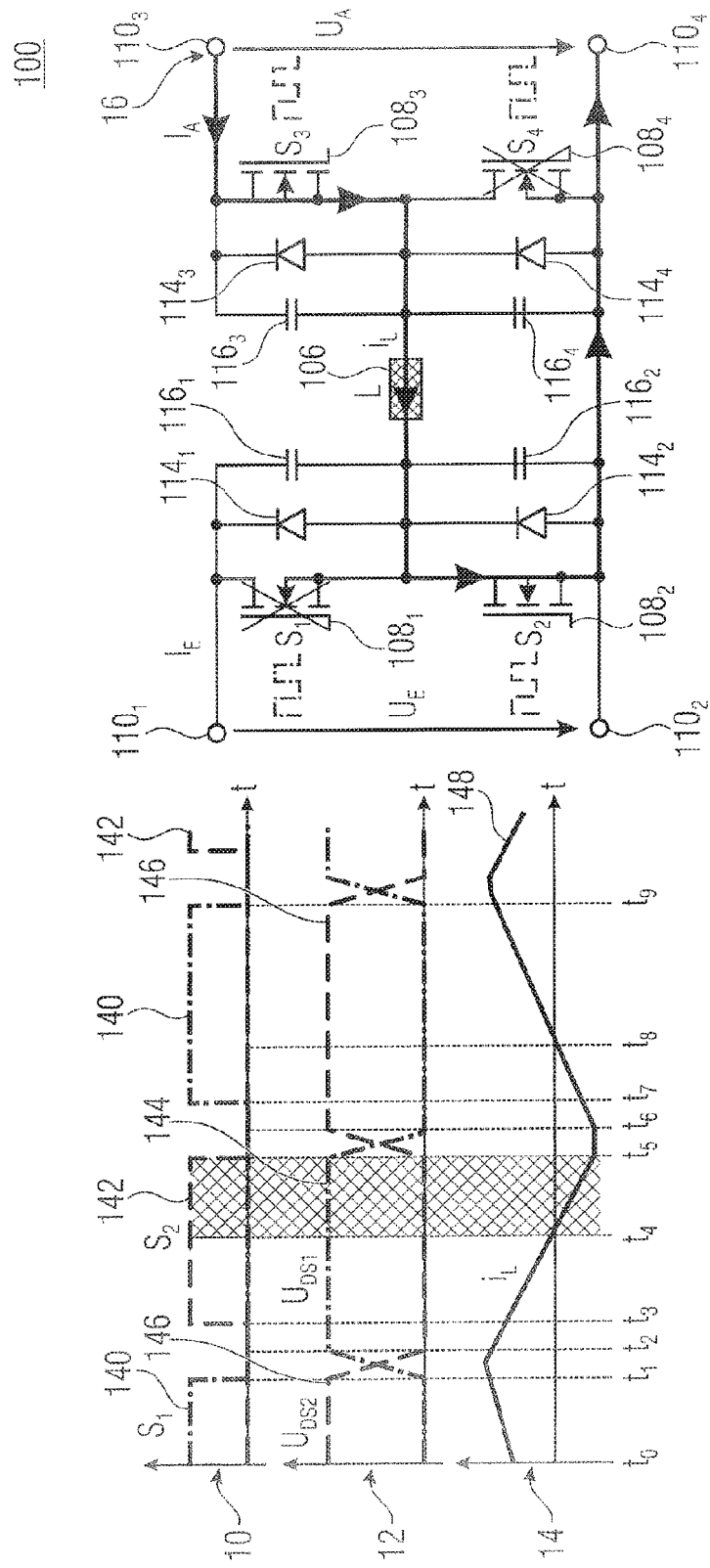
FIG. 4e shows in diagrams the control signal, current and voltage curves of the DC-DC converter across the switching period of the electric switching elements (e.g. PWM) as well as in a schematic block diagram a switching and current flow state during a fifth time interval of the switching period of the electric switching elements (e.g. PWM period)

FIG. 4e shows in a schematic block diagram 16 the current flow in the DC-DC converter 100 between the times $t_4$ and $t_5$ (during a fifth time interval of the switching period of the electric switching elements $108_1$ to $108_4$ (e.g. PWM period)). Between the times $t_4$ and $t_5$, the DC-DC converter 100 is still in the second switching state. At the time $t_4$, the direction of the current flow $i_L$ through the storage choke 106 has been inverted, whereby also the current in the DC-DC converter (related to FIG. 4d) has been inverted or, in other words, which results in a fifth current flow state in which the current in the DC-DC converter 100 flows from the third terminal $110_3$ via the third electric switching element $108_3$, via the storage choke 106 and via the second electric switching element $108_2$ to the fourth terminal $110_4$. In other words, FIG. 4e shows a fifth state of the current flow during a switching period of the electric switching elements $108_1$ to $108_4$ (e.g. PWM period).

Figure 4F:
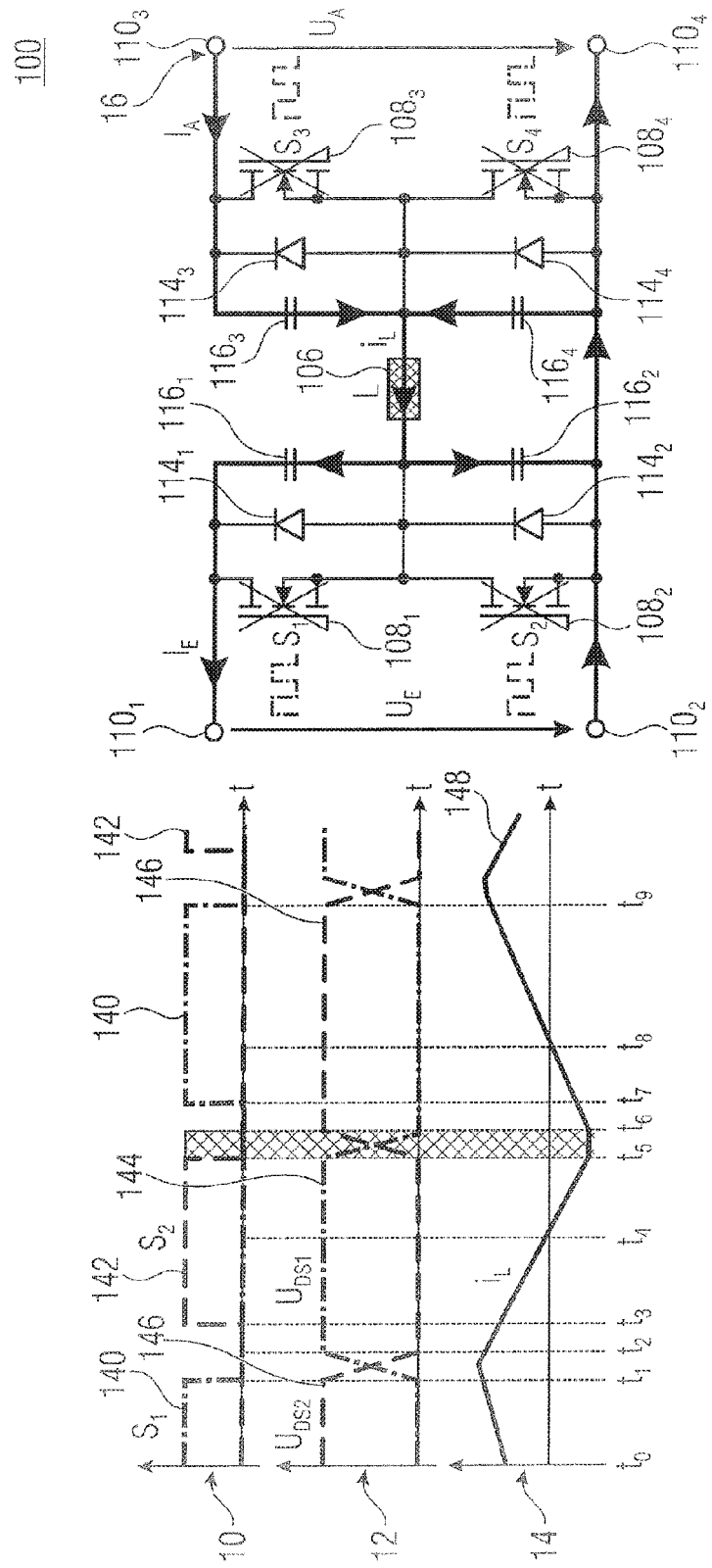
FIG. 4f shows in diagrams the control signal, current and voltage curves of the DC-DC converter across the switching period of the electric switching elements (e.g. PWM) as well as in a schematic block diagram a switching and current flow state during a sixth time interval of the switching period of the electric switching elements (e.g. PWM period)

FIG. 4f shows in a schematic block diagram 16 the current flow in the DC-DC converter 100 between the times $t_5$ and $t_6$ (during a sixth time interval of the switching period of the electric switching elements $108_1$ to $108_4$ (PWM period)). Between the times $t_5$ and $t_6$, the DC-DC converter 100 is in a dead time switching state, i.e., the first, second, third and fourth electric switching elements $108_1$ to $108_4$ are switched off. The current flow through the storage choke 106 cannot suddenly change, such that the storage choke 106 effects continued flow of the current $i_L$. As shown in FIG. 4f, this results in a sixth current flow state in which parasitic capacitances of previously switched on switching elements, i.e., the parasitic capacitances $116_2$ and $116_3$ of the second and third switching elements $108_2$ and $108_3$ are charged by the current flow $i_L$ through the storage choke 106 and in which parasitic capacitances of switching elements to be switched on, i.e., the parasitic capacitances $116_1$ and $116_4$ of the first and fourth electric switching elements $108_1$ to $108_4$ are discharged prior to switching on. In other words, FIG. 4f shows a sixth state of the current flow during a switching period of the electric switching elements $108_1$ to $108_4$ (e.g. PWM period).

Figure 4G:
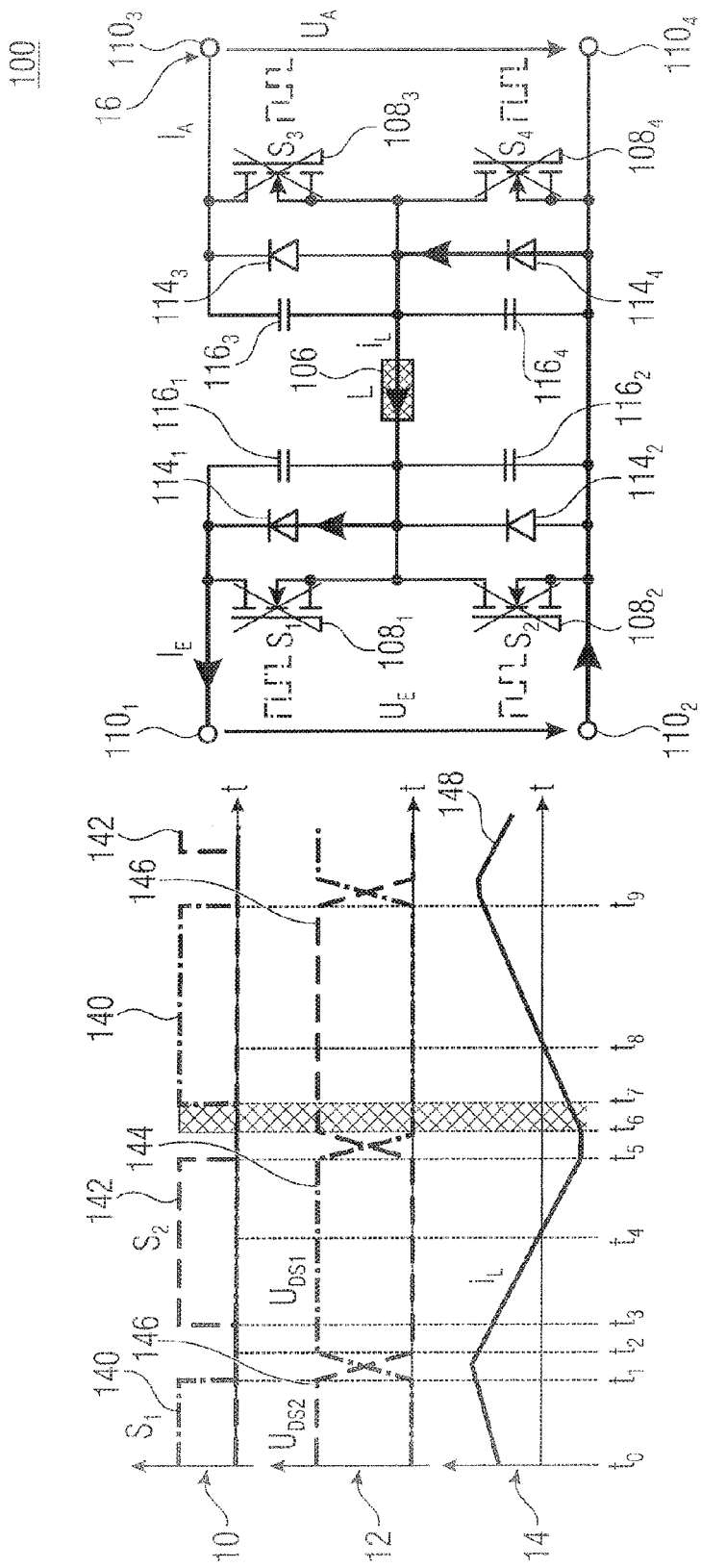
FIG. 4g shows in diagrams the control signal, current and voltage curves of the DC-DC converter across the switching period of the electric switching elements (e.g. PWM) as well as in a schematic block diagram a switching and current flow state during a seventh time interval of the switching period of the electric switching elements (e.g. PWM period)

FIG. 4g shows in a schematic block diagram 16 the current flow in the DC-DC converter 100 between the times $t_6$ and $t_7$ (during a seventh time interval of the switching period of the electric switching elements $108_1$ to $108_4$ (e.g. PWM period)). Between the times $t_6$ and $t_7$, the DC-DC converter 100 is still in the dead time switching state. Since at the time $t_6$ the parasitic capacitances of the previously switched on switching elements are (completely) charged as well as the parasitic capacitances of switching elements to be switched on are (completely) discharged and the storage choke 106 still effects continued flow of the current $i_L$, a seventh switching state results between the times $t_6$ and $t_7$ in which the current in the DC-DC converter 100 flows from the second terminal $110_2$ via the fourth diode $114_4$, the storage choke 106 and the first diode $114_1$ to the first terminal $110_1$. In other words, FIG. 4g shows a seventh state of the current flow during a switching period of the electric switching elements $108_1$ to $108_4$ (e.g. PWM period).

Figure 4H:
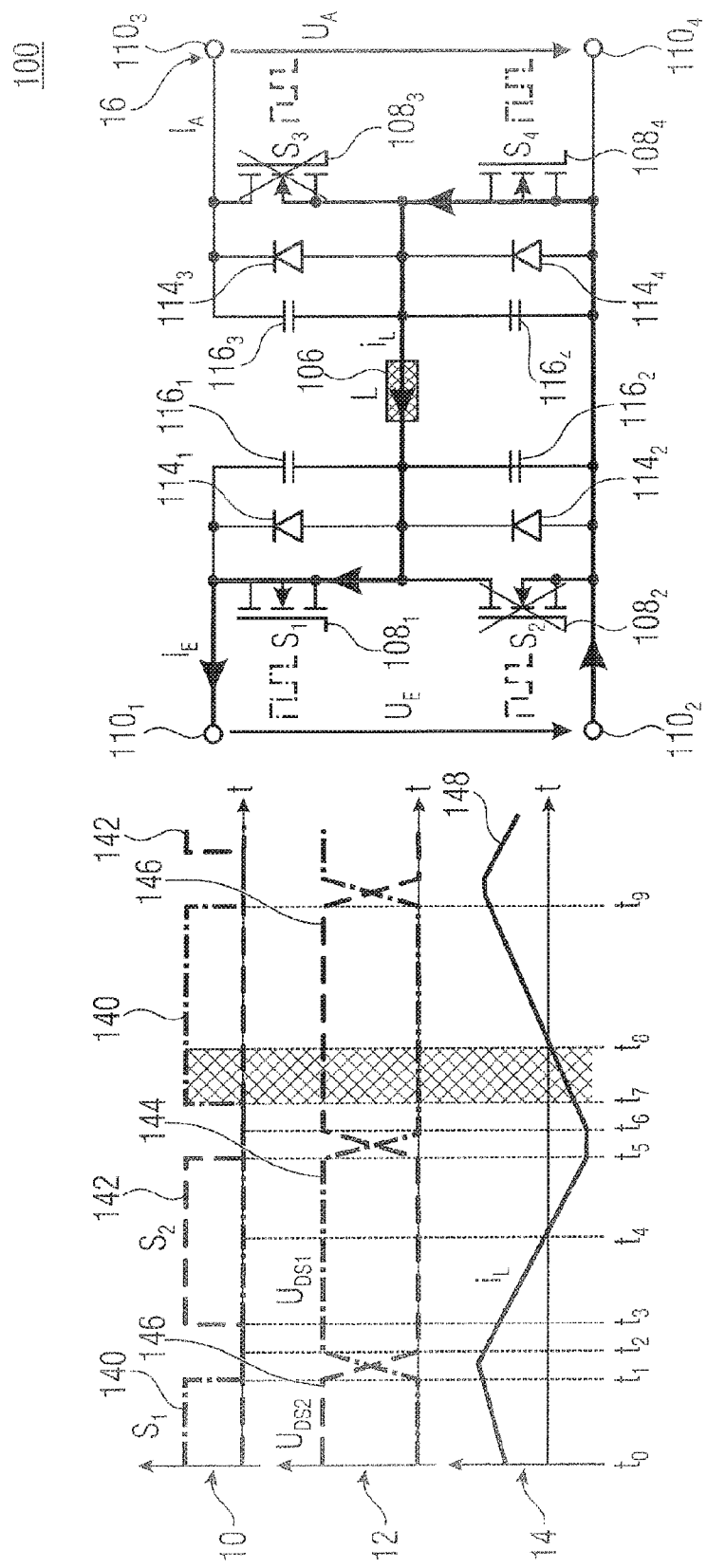
FIG. 4h shows in diagrams the control signal, current and voltage curves of the DC-DC converter across the switching period of the electric switching elements (e.g. PWM) as well as in a schematic block diagram a switching and current flow state during an eighth time interval of the switching period of the electric switching elements (e.g. PWM period)

FIG. 4h shows in a schematic block diagram 16 the current flow in the DC-DC converter 100 between the times $t_7$ and $t_8$ (during an eighth time interval of the switching period of the electric switching elements $108_1$ to $108_4$ (e.g. PWM period)). Between the times $t_7$ and $t_8$, the DC-DC converter 100 is again in the first switching state, i.e., the first electric switching element $108_1$ and the fourth electric switching elements $108_4$ are switched on, while the second electric switching element $108_2$ and the third electric switching element $108_3$ are switched off. This results in an eighth current flow state in which the current in the DC-DC converter 100 flows from the second terminal $110_2$ via the fourth electric switching element $108_4$, the storage choke 106 and the first electric switching element $108_1$ to the first terminal $110_1$. In other words, FIG. 4h shows an eighth state of the current flow during a switching period of the electric switching elements $108_1$ to $108_4$ (e.g. PWM period).

Between the times $t_8$ and $t_9$, the DC-DC converter 100 is still in the first switching state, but the direction of the current flow $i_L$ through the storage choke 106 is again inverted at the time $t_8$, such that again the first current flow state shown in FIG. 4a occurs in the DC-DC converter 100.

It should be noted that the eight time intervals shown in FIGS. 4a to 4h extending across the times $t_0$ to $t_8$ show no complete switching period of the electric switching elements $108_1$ to $108_4$. A complete switching period of the electric switching elements $108_1$ to $108_4$ would have, for example, the period duration $T=t_9-t_1$.

In other words, FIGS. 4a to 4h show the eight different states of the current flow in the buck-boost converter 100 within a switching period of the electric switching elements $108_1$ to $108_4$ (e.g. PWM period). The operations between the dead time are also considered. Each figure shows, on the left, the complementary PWM signals 140 and 142 for controlling the electric switching elements (power semiconductors) $108_1$ (S1) ($108_4$ (S$_4$)) and $108_2$ (S$_2$) ($108_3$ (S$_3$)), the drain source voltages 144 and 146 of the electric switching elements $108_1$ (S1) ($108_4$ (S$_4$)) and $108_2$ (S$_2$) ($108_3$ (S$_3$)) and the current $i_L$ through the storage choke 106. On the right, the current flow is illustrated in the respective state in the circuit. In the second current flow state (FIG. 4b), after switching off the first electric switching element $108_1$ (S$_1$) and the fourth electric switching element ($108_4$ (S$_4$)), the parasitic capacitors $116_2$ and $116_3$ of the second electric switching element $108_2$ (S$_2$) and the third electric switching element ($108_3$ (S$_3$) are discharged before switching them on. At the same time the parasitic capacitors $116_1$ and $116_4$ of the first electric switching element $108_1$ (S$_1$) and the fourth electric switching element ($108_4$ (S$_4$) are charged. In contrast to hard-switching concepts, in this concept, the current ripple in the storage choke (inductance) 106 is so great that the current $i_L$ can be inverted within a switching period of the electric switching elements $108_1$ to $108_4$ (e.g. PWM period). With the help of the inverted current, in the sixth current flow state (see FIG. 4f), the parasitic capacitors $116_1$ and $116_4$ of the first electric switching element $108_1$ (S$_1$) and the fourth electric switching element ($108_4$ (S$_4$) are discharged prior to switching them on. With this concept, the electric switching elements (power semiconductors) $108_1$ to $108_4$ can be soft-switched within a switching period of the electric switching elements $108_1$ to $108_4$ (e.g. PWM period).

However, it should be noted that the current ripple can vary in dependence on the input voltage $u_E$ and the output voltage $u_A$. Accordingly, the minimum value of the current flow $i_L$ through the storage choke 106 or the storage choke current $i_L$ can change. Further, the arithmetic mean of the current flow $i_L$ through the storage choke 106 can also have an influence on the minimum value of the current flow $i_L$ through the storage choke 106. Thus, a solution has to be found such that the condition for the ZVS reduced operation of the electric switching elements $108_1$ to $108_4$ is ensured at all operating points and at the same time the current ripple is not too great such than an improved (or even maximum) efficiency of the DC-DC converter 100 can be obtained. The solution is the modulation of the switching frequency of the electric switching elements $108_1$ to $108_4$ described in detail below.

As has already been mentioned, the DC-DC converter 100 can be configured to track or readjust a switching frequency of the electric switching elements $108_1$ to $108_1$ in case of a change of operating parameters of the DC-DC converter 100 such that a change of direction of the current flow $i_L$ through the storage choke 106 is ensured and at the same time the minimum value of the current flow $i_L$ through the storage choke 106 is adjusted within an optimum range. The aim is that the ZVS reduced operation of the electric switching elements $108_1$ to $108_n$ during a switching period of the electric switching elements $108_1$ to $108_4$ (e.g. PWM period) is ensured and the current ripple of the current flow through the storage choke 106 remains as small as possible. In this way, optimum efficiency of the DC-DC converter 100 can be obtained.

Here, the DC-DC converter 100 can be configured to track or readjust the switching frequency of electric switching elements $108_1$ to $108_4$ such that a current ripple of the current flow $i_L$ through the storage choke 106 is so great that a direction of current flow $i_L$ through the storage choke 106 is inverted at least once during a switching period of the electric switching elements $108_1$ to $108_4$ and in this way the ZVS reduced operation of the electric switching elements $108_1$ to $108_4$ during a switching period of the electric switching elements $108_1$ to $108_4$ (e.g. PWM period) is ensured.

Further, the DC-DC converter 100 can be configured to track or readjust the switching frequency of the electric switching elements $108_1$ to $108_4$ such that the current ripple of the current flow $i_L$ through the storage choke 106 is at least so great that parasitic capacitances $116_1$ to $116_4$ of electric switching elements $108_1$ to $108_4$ to be switched on are discharged, prior to switching on, to at least 25% of a first voltage $u_1$ applied to the first DC voltage gate 102 or a second voltage $u_2$ applied to the second DC voltage gate 104.

In other words, by modulating the switching frequency of the electric switching elements $108_1$ to $108_4$, the current ripple in the storage choke (inductance) 106 can be continuously adapted by changing the switching frequency such that, on the one hand, the electric switching elements $108_1$ to $108_4$ are operated in a ZVS reduced manner and such that, on the other hand, the current ripple does not become too great and the conduction losses in the electric switching elements (switches) $108_1$ to $108_4$ and the losses in the storage choke 106 do not significantly increase.

Here, it is possible to modulate the switching frequency of the electric switching elements (power semiconductors) $108_1$ to $108_4$ across the whole operating range.

By using the above described operating mode of the electric switching elements (power semiconductors) $108_1$ to $108_4$, the current ripple $\Delta i_L$ in the storage choke (inductance) 106 can be determined as follows:

$$u_E - L \cdot \frac{\Delta i_L}{D \cdot T} \to \Delta i_L = \frac{u_E \cdot u_A}{u_E + u_A} \cdot \frac{1}{L \cdot f} \qquad \text{(EQ. 1-8)}$$

When $I_L$ is the arithmetic mean of the current flow $i_L$ through the storage choke 106 and $I_{L,min}$ is the minimum value of the current flow $i_L$ through the storage choke 106 within a switching period of the electric switching elements $108_1$ to $108_4$ (PWM period), then the following results:

$$\Delta i_L = 2(I_L - I_{L,min}) = 2(I_L + |I_{L,min}|) \qquad \text{(EQ. 1-9)}$$

From (EQ. 1-8) it can be seen that the current ripple is independent of the transmitted power through the buck-boost converter 100, as long as the switching frequency f, input voltage $u_E$ and output voltage $u_A$ do not change. This has the effect that the efficiency of the DC-DC converter 100 at lower powers is decreased compared to great powers due to the unamended current ripple $\Delta i_L$. An option for reducing power losses is varying the inductance L. However, this is very expensive as regard to circuit technology. The solution suggested herein is to adaptively change the current ripple $\Delta i_L$ by varying the switching frequency f of the electric switching elements $108_1$ to $108_4$ in order to ensure the condition for soft switching (ZVS reduced). At the same time, the current ripple may not become too great such that an improved (or even maximum) efficiency of the converter 100 can be obtained at any operating point. The necessitated switching frequency f can be determined for an operating point in four steps.

A first step for determining the switching frequency of the electric switching elements $108_1$ to $108_4$ includes determining the minimum value of the current flow $I_{L,min}$ through the storage choke 106 (ensuring the condition for ZVS reduced operation).

Figure 5:
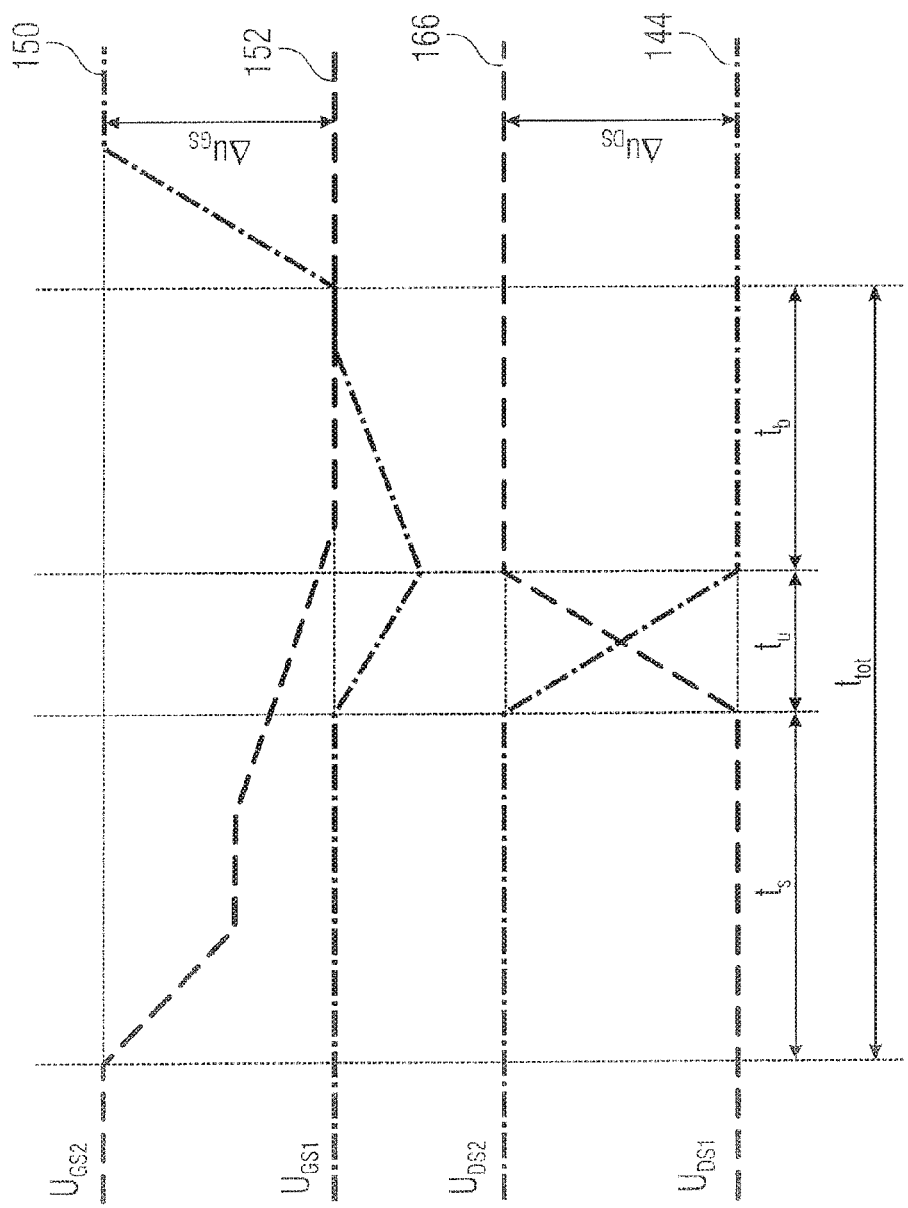
FIG. 5 shows in a diagram a curve of the voltage drop across the first electric switching element, a curve of the voltage drop across the second electric switching element, a curve of a control voltage of the first electric switching element and a curve of a control voltage of the second electric switching element each during a dead time of the DC-DC converter.

FIG. 5 shows in a diagram a curve of the voltage drop 144 across the first electric switching element $108_1$, a curve of the voltage drop 146 across the second electric switching element $108_2$, a curve of a control voltage 150 of the first electric switching element $108_1$ and a curve of a control voltage 152 of the second electric switching element $108_2$, each during a dead time of the DC-DC converter 100.

Here, the dead time of the DC-DC converter 100 can be the time during which the DC-DC converter is in the dead time state, i.e., during which the electric switching elements $108_1$ to $108_4$ are switched off. In other words, the duration of the dead time state of the DC-DC converter 100 can be referred to as dead time.

As has already been mentioned, the electric switching elements $108_1$ to $108_4$ can be implemented by means of MOSFETs, such that the voltage drop 144 across the first electric switching element $108_1$ can be a first drain source voltage $u_{DS1}$, the voltage drop 146 across the second electric switching element $108_2$ can be a second drain source voltage $u_{DS2}$, the control voltage 150 of the first electric switching element $108_1$ can be a first gate source voltage $u_{GS1}$ and the control voltage 152 of the second electric switching element $108_2$ can be a second gate source voltage $u_{GS2}$.

Here, it can be inferred from FIG. 5 that the dead time $t_t$ can be divided into a time period $t_s$ for completely blocking the channel of the second electric switching element $108_2$ ($S_2$), a time period $t_u$ for reloading the parasitic capacitors of the MOSFETs from the negative storage choke current and a buffer time $t_b$ ($t_t = t_s + t_u + t_b$).

Further, in FIG. 5 a difference $\Delta u_{GS}$ of the gate source voltages $u_{GS1}$ and $u_{GS2}$ as well as a difference of the drain source voltages $u_{DS1}$ and $u_{DS2}$ is shown.

In other words, FIG. 5 shows a commutation process within the dead time $t_{dead}$ between switching off the second electric switching element $108_2$ ($S_2$) and switching on the first electric switching element $108_1$ ($S_2$).

The time $t_s$ for completely blocking the channel of the electric switching element depends on the input capacitance of the electric switching element (e.g. MOSFETs), the gate resistance of the electric switching element and the difference $\Delta u_{GS}$ of the gate source voltages $u_{GS1}$ and $u_{GS2}$ and can be fixed by measurements. Since the change of the current flow $i_L$ in the storage choke (inductance) 106 when reloading the parasitic capacitances $116_1$ to $116_4$ is very small, it can be assumed that the current flow $i_L$ through the storage choke 106 remains constant during the dead time $t_u$. Consequently, the dead time $t_u$ can approximately be determined from (EQ. 1-10):

$$|I_{L,min}| = 2 \cdot C_{oss} \frac{\Delta u_{GS}}{t_u} \rightarrow t_u = \frac{\Delta u_{GS} \cdot 2 C_{oss}}{|I_{L,min}|} \quad \text{(EQ. 1-10)}$$

Here, $C_{oss}$ is the output capacitance of the electric switching element (e.g. MOSFETs). The difference $\Delta u_{GS}$ of the gate source voltages $u_{GS1}$ and $u_{GS2}$ in the first electric switching element $108_1$ ($S_1$) and the second electric switching element $108_2$ ($S_2$) is approximately equal to the input voltage $u_E$. In order to switch the electric switching elements (e.g. MOSFETs) in a soft manner, the following condition can be fulfilled:

$$t_b \geq 0 > t_s | t_u \leq t_{dead} \quad \text{(EQ. 1-11)}$$

By inserting (EQ. 1-10) into (EQ. 1-11), the following results for the minimum coil current:

$$|I_{L,min}| \geq \frac{u_E \cdot 2 C_{oss}}{t_{dead} - t_s} \quad \text{(EQ. 1-12)}$$

A second step for determining the switching frequency of the electric switching elements $108_1$ to $108_4$ includes determining the optimum switching frequency $f_{nominal}$.

By inserting (EQ. 1-9) into (EQ. 1-8), the optimum switching frequency can be determined:

$$f_{nominal} = \frac{u_E \cdot u_A}{u_E + u_A} \cdot \frac{1}{2 \cdot L \cdot (I_L + |I_{L,min}|)} \quad \text{(EQ. 1-13)}$$

Here, the input voltage, $u_E$, the output voltage $u_A$ and the arithmetic mean $I_L$ of the current flow through the storage choke 106 can be sensed by measurement sensors.

A fourth step for determining the switching frequency of the electric switching elements $108_1$ to $108_4$ includes considering the maximum and minimum limiting values $f_{max}$ and $f_{min}$ of the switching frequency.

The maximum possible switching frequency $f_{max}$ is limited by the minimum switching speed of the electric switching elements (e.g. MOSFETs) $108_1$ to $108_4$. If $T_{on,min}$ (e.g. 500 ns) is defined as the minimum possible time period of the switch on time or operating time of the electric switching elements (e.g. MOSFETs) $108_1$ to $108_4$, the following results:

$$D \cdot T = \frac{u_A}{u_E + u_A} \cdot \frac{1}{f} \geq T_{on,min} \quad \text{(EQ. 1-14)}$$

$$(1 - D) \cdot T = \frac{u_E}{u_E + u_A} \cdot \frac{1}{f} \geq T_{on,min} \quad \text{(EQ. 1-15)}$$

Thus, the following applies for the maximum switching frequency $f_{max}$ for the two following input and output voltages:

When $u_E > u_A$, then $$f_{max} = \frac{u_A}{u_E + u_A} \cdot \frac{1}{T_{on,min}} \quad \text{(EQ. 1-16)}$$

When $u_E < u_A$, then $$f_{max} = \frac{u_E}{u_E + u_A} \cdot \frac{1}{T_{on,min}} \quad \text{(EQ. 1-17)}$$

The minimum possible switching frequency $f_{min}$ can essentially be determined via preventing overload of the input and output capacitors $118_1$ and $118_2$ as well as an acoustic interference of the loads at a switching frequency that is too low.

A fourth step for determining the switching frequency of the electric switching elements $108_1$ to $108_4$ includes determining the switching frequency $f_{actual}$.

The switching frequency can be defined as follows, for example by a C program:

```
if (f_nominal >= f_max)
    f_actual = f_max;
else if (f_min < f_nominal < f_max)
    f_actual = f_nominal;
else
    f_actual = f_min;
```

Figure 6:
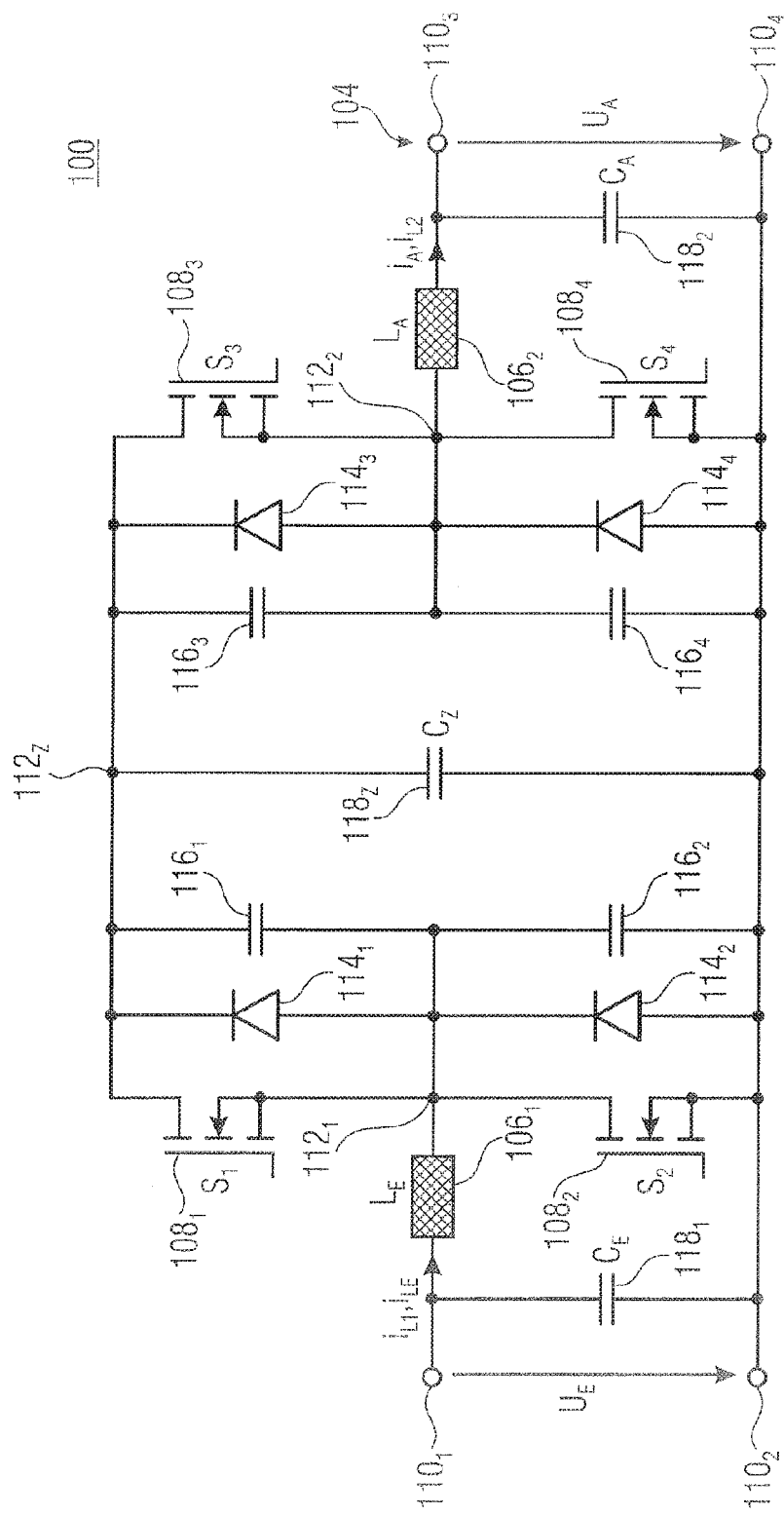
FIG. 6 shows a schematic block diagram of the DC-DC converter according to a further embodiment.

FIG. 6 shows a schematic block diagram of the DC-DC converter 100 according to an embodiment. As can be seen in FIG. 6, the DC-DC converter 100 can comprise a first storage choke $106_1$ (input storage choke $L_E$), a second storage choke $106_2$ (output storage choke $L_A$) and four electric switching elements $108_1$ to $108_4$.

Here, a first electric switching element $108_1$ and second electric switching element $108_2$ of the four electric switching elements $108_1$ to $108_4$ can be connected in series between an intermediate circuit node $112_Z$ and a second terminal $110_2$ of the first DC voltage gate 102, while a third electric switching element $108_3$ and a fourth electric switching element $108_4$ of the four electric switching elements $108_1$ to $108_4$ are connected in series between the intermediate circuit node $112_Z$ and a fourth terminal $110_4$ of the second DC voltage gate 104.

The first storage choke $106_1$ can be connected in series between a first terminal $110_1$ of the first DC voltage gate 102 and a first node $112_1$, while the second storage choke $106_2$ can be connected in series between a third terminal $110_3$ of the second DC voltage gate 104 and the second node $112_2$. Here, the first node $112_1$ can be connected in series between the first electric switching element $108_1$ and the second electric switching element $108_2$, while the second node $112_2$ can be connected in series between the third electric switching element $108_3$ and the fourth electric switching element $108_4$.

Thus, the first electric switching element $108_1$ can be connected in series between the first terminal $110_1$ and the first node $112_1$, while the second electric switching element $108_2$ can be connected in series between the first node $112_1$ and the second terminal $110_2$. Accordingly, the third electric switching element $108_3$ can be connected in series between the third terminal $110_3$ and the second node $112_2$, while the fourth electric switching element $108_4$ can be connected in series between the second node $112_2$ and the fourth terminal $110_4$.

As can be seen in FIG. 6, a first voltage $u_1$ can be applied to the first DC voltage gate 102, while a second voltage $u_2$ can be applied to the second DC voltage gate 104. Here, the DC-DC converter 100 can be configured to provide the second voltage $u_2$ based on the first voltage $u_1$, while the second voltage $u_2$ can be greater than, less than or equal to the first voltage $u_1$. Obviously, the DC-DC converter 100 can also be configured to provide the first voltage $u_1$ based on the second voltage $u_2$, wherein the first voltage $u_1$ can be greater than, less than or equal to the second voltage $u_2$.

Further, the DC-DC converter 100 can comprise four diodes (free-wheeling diodes) $114_1$ to $114_4$ which are connected anti-parallel to the four electric switching elements $108_1$ to $108_4$.

For example, a first diode $114_1$ of the four diodes $114_1$ to $114_4$ can be connected in parallel to the first electric switching element $108_1$, such that a cathode of the first diode $114_1$ is connected to the first terminal $110_1$, while an anode of the first diode $114_1$ is connected to the first node $112_1$. A second diode $114_2$ of the four diodes $114_2$ to $114_4$ can be connected in parallel to the second electric switching element $108_2$, such that a cathode of the second diode $114_2$ is connected to the first node $112_1$, while an anode of the second diode $114_2$ is connected to the second terminal $110_2$. A third diode $114_3$ of the four diodes $114_1$ to $114_4$ can be connected in parallel to the third electric switching element $108_3$, such that a cathode of the third diode $114_3$ is connected to the third terminal $110_3$ while an anode of the third diode $114_3$ is connected to the second node $112_2$. A fourth diode $114_4$ of the four diodes $114_1$ to $114_4$ can be connected in parallel to the fourth electric switching element $108_4$, such that a cathode of the fourth diode $114_4$ is connected to the second node $112_2$, while an anode of the fourth diode $114_4$ is connected to the fourth terminal $110_4$.

Further, the DC-DC converter 100 can comprise a first capacitance $118_1$ (e.g. a first capacitor) and a second capacitance $118_2$ (e.g. a second capacitor), wherein the first capacitance $118_1$ can be connected in series between the first terminal $110_1$ and the second terminal $110_2$, and wherein the second capacitance $118_2$ can be connected in series between the third terminal $110_3$ and the fourth terminal $110_4$.

Further, the DC-DC converter 100 can comprise an intermediate circuit capacitance $118_Z$ which can be connected in series between the intermediate circuit node $112_Z$ and the second terminal $110_2$ or the fourth terminal $110_4$.

Above that, the schematic block diagram of the DC-DC converter 100 shown in FIG. 6 comprises four capacitances $116_1$ to $116_4$ which are to represent the parasitic capacitances of the four electric switching elements $108_1$ to $108_4$. The four capacitances $116_1$ to $116_4$ can also be externally connected capacitors, such as snubber capacitors.

In the following, it is assumed that the first DC voltage gate 110 is a DC voltage input gate and that the second DC voltage gate 104 is a DC voltage output gate.

Accordingly, the first voltage $u_1$ applied to the first DC voltage gate 102 can be an input voltage $u_E$, while the second voltage $u_2$ applied to the second DC voltage gate 104 can be an output voltage $u_A$. Further, the first capacitance $118_1$ can be an input capacitance $C_E$, while the second capacitance $118_2$ can be an output capacitance $C_A$.

The switching losses of the DC-DC converter 100 can be reduced by implementing, on the one hand, the DC-DC converter 100 such that a direction of a current flow $i_{L1}$ (input current $i_E$) through the first storage choke $106_1$ and a direction of the current flow $i_{L2}$ (output current $i_A$) through the second storage choke $106_2$ are inverted at least once during a switching period of the electric switching elements $108_1$ to $108_4$ (e.g. PWM period), and on the other hand, the switching frequency of the electric switching elements $108_1$ to $108_4$ is tracked or readjusted such that a change of direction of the current flow $i_{L1}$ through the first storage choke $106_1$ and the current flow $i_{L2}$ through the second storage choke $106_2$ during a switching period of the electric switching elements $108_1$ to $108_4$ (e.g. PWM period) is ensured. Here, this concept is referred to as resonant (switching) loss reduction with frequency modulation (concept 1).

In the following, the concept for resonant (switching) loss reduction without transition phase and with frequency modulation (concept 1) will be described in detail.

The DC-DC converter 100 can be configured to switch, in a buck-boost mode of the DC-DC converter 100, (periodically) between a first switching state in which the first electric switching element $108_1$ and the fourth electric switching element $108_4$ are switched on (and the second electric switching element $108_2$ and the third electric switching element $108_3$ are switched off) and a second switching state in which the second electric switching element $108_2$ and the third electric switching element $108_3$ are switched on (and the first electric switching element $108_1$ and the fourth electric switching element $108_4$ are switched off).

Here, the DC-DC converter 100 can be configured to switch between the first switching state and the second switching state such that switching between the first switching state and the second switching state and switching between the second switching state and the first switching state comprises a dead time in which the electric switching elements $108_1$ to $108_4$ are switched off.

In other words, in the control method without transition phase, the electric switching elements (switches) $108_1$ ($S_1$) and $108_4$ ($S_4$) can be switched on or off continuously complementary to the electric switching elements (switches) $108_2$ ($S_2$) and $108_3$ ($S_3$). For preventing a short circuit at the DC voltage input gate (input) 102 and at the DC voltage output gate (output) 104 of the DC-DC converter (converter) 100, a dead time can be provided between switching on and off the electric switching elements (power semiconductors) $108_1$ to $108_4$. In the stationary state, the following results:

$$\frac{U_A}{U_E} = \frac{I_E}{I_A} = \frac{I_{L1}}{I_{L2}} = \frac{D}{1-D} \qquad \text{(EQ. 1-18)}$$

Here, D is the duty cycle in the stationary state and is defined as division between the switch on time of the switches $108_2$ ($S_2$) and $108_3$ ($S_3$) and the switching period (PWM period). From this, it can be inferred that the output voltage of the buck-boost converter 100 can be continuously controlled from zero to infinity by adjusting the duty cycle.

In embodiments, an inductance L1 of the first storage choke $106_1$ and an inductance L2 of the second storage choke can be dimensioned such that direction of a current flow $i_{L1}$ through the first storage choke $106_1$ and a direction of a current flow $i_{L2}$ through the second storage choke $106_2$ are inverted at least once during a switching period of the electric switching elements $108_1$ to $108_4$ (e.g. PWM period).

Here, the inductance L1 of the first storage choke $106_1$ and the inductance L2 of the second storage choke $106_2$ can be dimensioned such that a current ripple of the current flow $i_{L1}$ through the first storage choke $106_1$ and a current ripple of the current flow $i_{L2}$ through the second storage choke $106_2$ is so great that a direction of a current flow $i_{L1}$ through the first storage choke $106_1$ and a direction of a current flow $i_{L2}$ through the second storage choke $106_2$ are inverted at least once during a switching period of the electric switching elements $108_1$ to $108_4$ (e.g. PWM period).

Further, the inductance L1 of the first storage choke $106_1$ and the inductance L2 of the second storage choke $106_2$ can be dimensioned such that by the current flow $i_{L1}$ through the first storage choke $106_1$ and by the current flow $i_{L2}$ through the second storage choke $106_2$, parasitic capacitances $116_1$ to $116_4$ of electric switching elements $108_1$ to $108_4$ to be switched on are discharged prior to switching on and/or that by the current flow $i_{L1}$ through the first storage choke $106_1$ and by the current flow $i_{L2}$ through the second storage choke $106_2$, parasitic capacitances $116_1$ to $116_4$ of previously switched on electric switching elements $108_1$ to $108_4$ are charged.

Thus, in the ZVS reduced operation of the electric switching elements (switches) $108_1$ to $108_4$ the current $i_L$ in the storage choke (inductance) 106 is inverted twice within a switching period of the electric switching elements $108_1$ to $108_4$ (e.g. PWM period) by a respective design of the storage choke 106. This has the effect that the parasitic capacitors $116_1$ to $116_4$ of the electric switching elements (e.g. power semiconductors) $108_1$ to $108_4$ can be discharged prior to their switching on between the dead time of the storage choke current $i_L$. In that way, the electric switching elements $108_1$ to $108_4$ can be (continuously) switched in a soft (ZVS) manner. Thereby, switching losses can be reduced (or even minimized).

FIGS. 7a to 7h show in diagrams control signal, current and voltage curves of the DC-DC converter 100 across a switching period of the electric switching elements $108_1$ to $108_4$ (e.g. PWM period) as well as in schematic block diagrams switching and current flow states of the DC-DC converter 100 during different time intervals of the switching period of the electric switching elements $108_1$ to $108_4$ (e.g. PWM period).

In detail, FIGS. 7a-7h each show in a first diagram 10 a curve of a first control signal 140 of the first and fourth electric switching elements $108_1$ to $108_4$ and curve of a second control signal 142 of the second and third electric switching elements $108_1$ to $108_4$, in a second diagram 12 a curve of a voltage drop 144 (drain source voltage $U_{DS1}$) across the first electric switching element $108_1$ and a curve of a voltage drop 146 (drain source voltage $u_{DS2}$) across the second electric switching element $108_2$, and in a third diagram 14 a curve of the current flow $148_1$ ($i_{L1}$) through the first storage choke $106_1$ and a curve of the current flow $148_2$ ($i_{L2}$) through the second storage choke $106_2$.

Figure 7A:
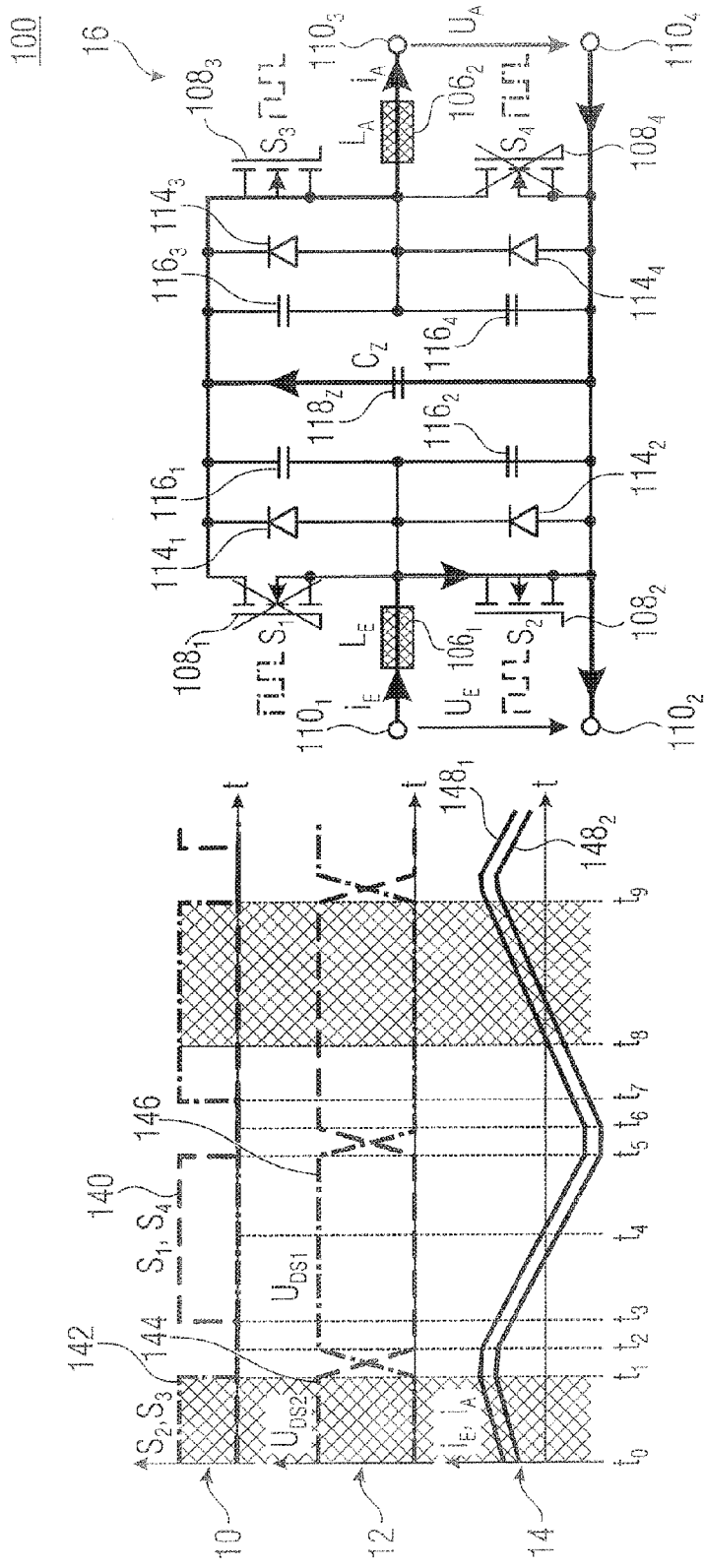
FIG. 7a shows in diagrams control signal, current and voltage curves of the DC-DC converter across a switching period of the electric switching elements (e.g. PWM period) as well as in a schematic block diagram a switching and current flow state during a first time interval of the switching period of the electric switching elements (e.g. PWM period)

Here, FIG. 7a shows in a schematic block diagram 16 the current flow in the DC-DC converter 100 between the times $t_0$ and $t_1$ (during a first time interval of the switching period of the electric switching elements $108_1$ to $108_4$ (e.g. PWM period)). Between the times $t_0$ and $t_1$, the DC-DC converter 100 is in the second switching state, i.e. the first electric switching element $108_1$ and the fourth electric switching element $108_4$ are switched off while the second electric switching element $108_2$ and the third electric switching element $108_3$ are switched on. This results in a first current flow state with a first current path extending from the first terminal $110_1$ via the first storage choke $106_1$, the second electric switching element $108_2$ to the second terminal $110_2$, and a second current path that extends from the fourth terminal $110_4$ via the intermediate circuit capacitance $118_Z$, the third electric switching element $108_3$, the second storage choke $106_2$ to the third terminal $110_3$. In other words, FIG. 7a shows a first state of the current flow during a switching period of the electric switching elements $108_1$ to $108_4$ (e.g. PWM period).

Figure 7B:
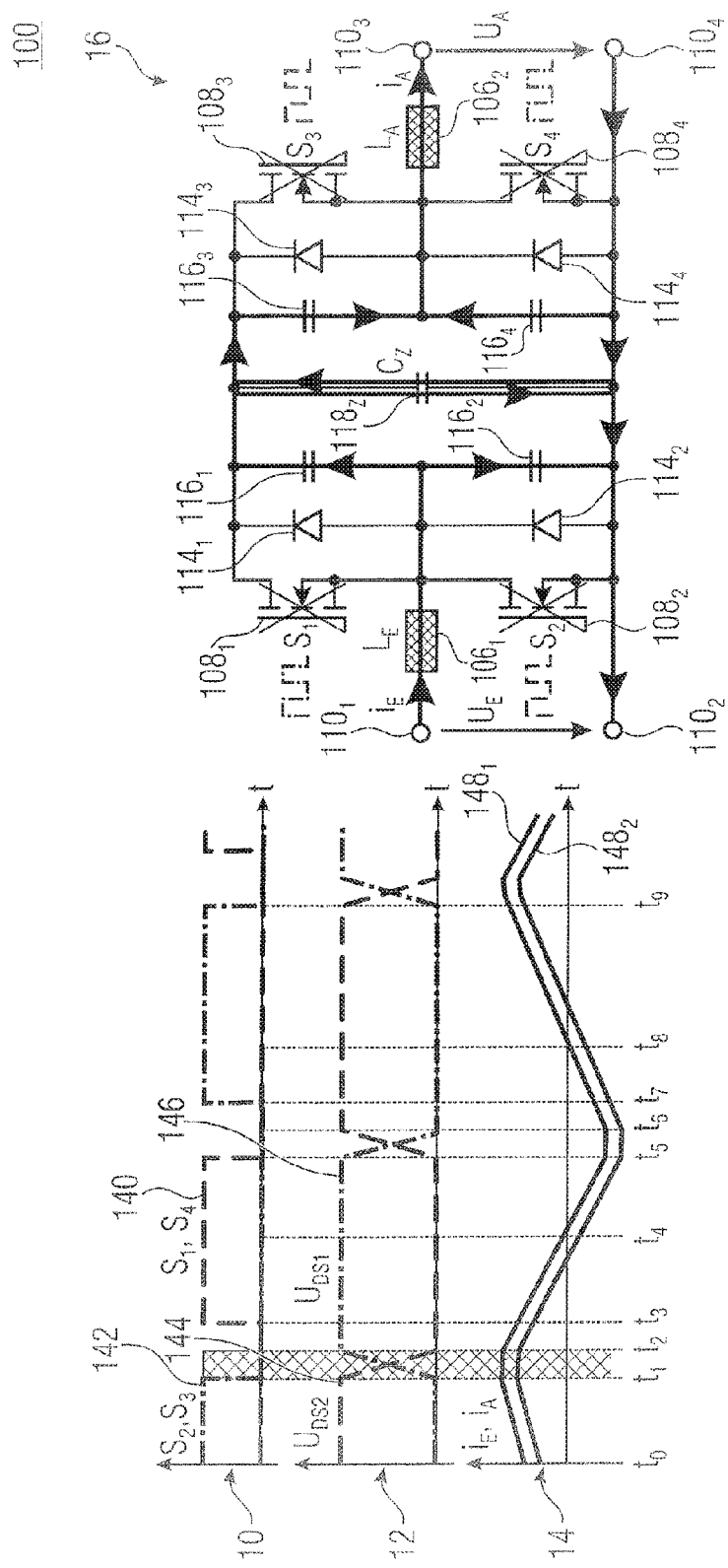
FIG. 7b shows in diagrams the control signal, current and voltage curves of the DC-DC converter across the switching period of the electric switching elements (e.g. PWM period) as well as in a schematic block diagram a switching and current flow state during a second time interval of the switching period of the electric switching elements (e.g. PWM period)

FIG. 7b shows in a schematic block diagram 16 the current flow in the DC-DC converter 100 between the times $t_1$ and $t_2$ (during a second time interval of the switching period of the electric switching elements $108_1$ to $108_4$ (e.g. PWM period)). Between the times $t_1$ and $t_2$, the DC-DC converter 100 is in a dead time switching state, i.e. the first, second, third and fourth electric switching elements $108_1$ to $108_4$ are switched off. The current flow through the first storage choke $106_1$ and the current flow through the second storage choke $106_2$ cannot suddenly change, such that the storage choke $106_1$ effects continued flow of the current $i_{L1}$ while the second storage choke effects continued flow of the current $i_{L2}$. As shown in FIG. 7b, this results in a second current flow state with a first current path extending from the first terminal $110_1$ via the first storage choke $106_1$, the first parasitic capacitance $116_1$ and the intermediate circuit capacitance $118_Z$ to the second terminal $110_2$, a second current path extending from the first terminal $110_1$ via the first storage choke $106_1$, the second parasitic capacitance $116_2$ to the second terminal $110_2$, a third current path extending from the fourth terminal $110_4$ via the intermediate circuit capacitance $118_Z$, the third parasitic capacitance $116_3$ and the second storage choke $106_2$ to the third terminal $110_3$, and a fourth current path extending from the fourth terminal $110_4$ via the fourth parasitic capacitance $116_4$ and the second storage choke $106_2$ to the third terminal $110_3$, such that the parasitic capacitances $116_2$ and $116_3$ of the electric switching elements $108_2$ and $108_3$ are charged after switching off and the parasitic capacitances $116_1$ and $116_4$ of the electric switching elements $108_1$ and $108_4$ are discharged prior to switching on. In other words, FIG. 7b shows a second state of the current flow during a switching period of the electric switching elements $108_1$ to $108_4$ (e.g. PWM period).

Figure 7C:
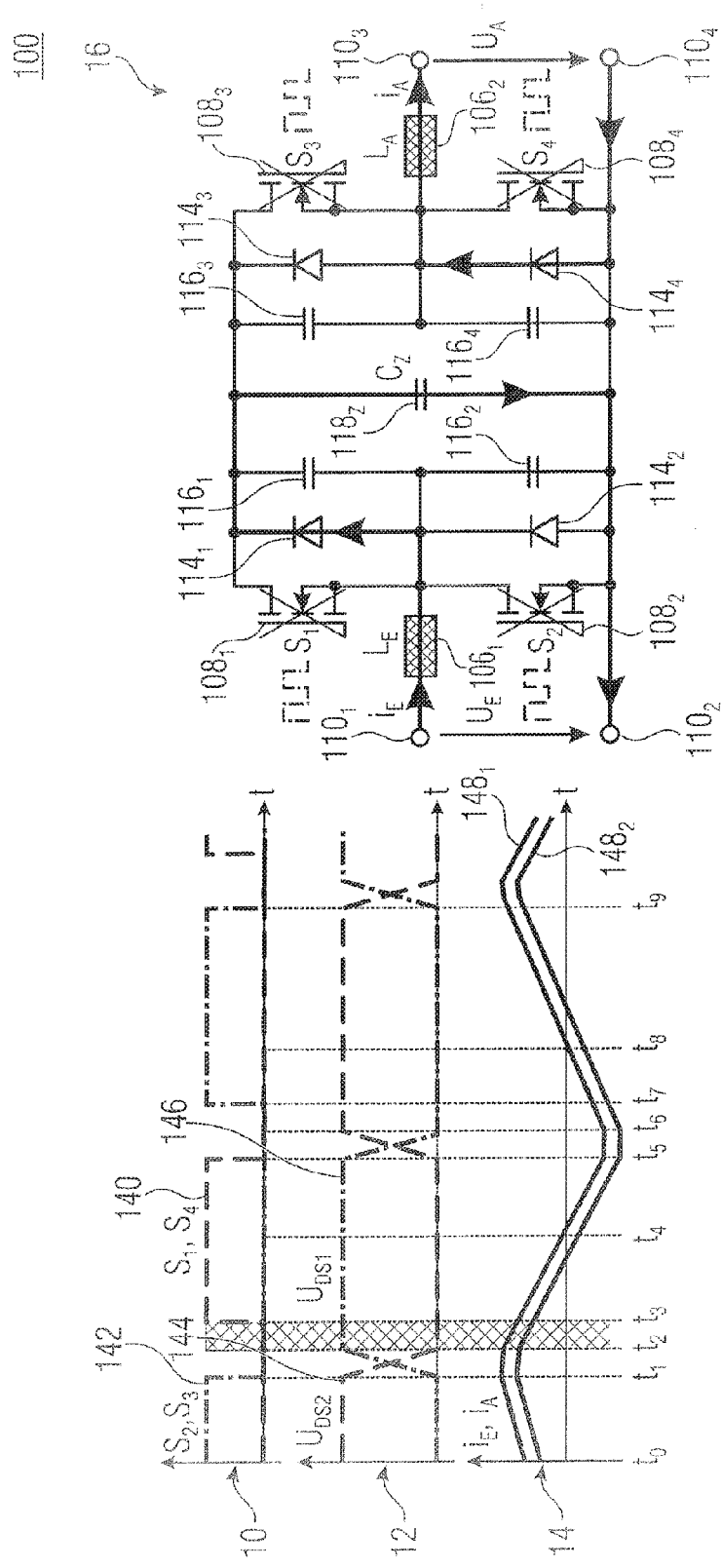
FIG. 7c shows in diagrams the control signal, current and voltage curves of the DC-DC converter across the switching period of the electric switching elements (e.g. PWM period) as well as in a schematic block diagram a switching and current flow state during a third time interval of the switching period of the electric switching elements (e.g. PWM period)

FIG. 7c shows in a schematic block diagram 16 the current flow in the DC-DC converter 100 between the times $t_2$ and $t_3$ (during a third time interval of the switching period of the electric switching elements $108_1$ to $108_4$ (e.g. PWM period)). Between the times $t_2$ and $t_3$, the DC-DC converter 100 is still in the dead time switching state. Since at the time $t_2$ the parasitic capacitances of the previously switched on switching elements are (completely) charged as well as the parasitic capacitances of switching elements to be switched on are (completely) discharged and the storage chokes $106_1$ and $106_2$ still effect continued flow of the current $i_{L1}$ and the current $i_{L2}$ a third current flow state results between times $t_2$ and $t_3$ with a first current path extending from the first terminal $110_1$ via the first storage choke $106_1$, the first diode $114_1$ and the intermediate circuit capacitance $118_Z$ to the second terminal $110_2$, and a second current path extending from the fourth terminal $110_4$ via the fourth diode $114_4$ and the second storage choke $106_2$ to the third terminal $110_3$. In other words, FIG. 7c shows a third state of the current flow during a switching period of the electric switching elements $108_1$ to $108_4$ (e.g. PWM period).

Figure 7D:
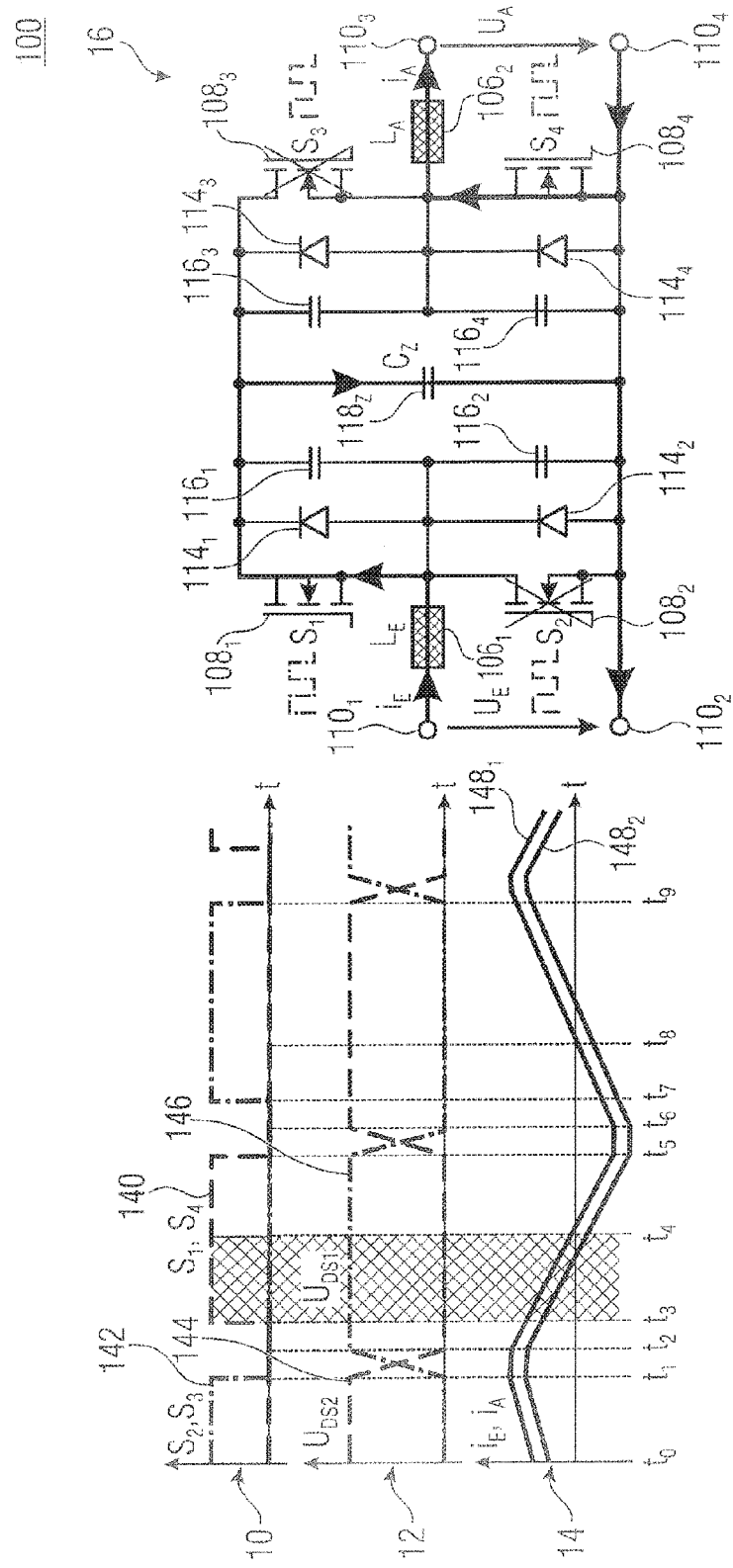
FIG. 7d shows in diagrams the control signal, current and voltage curves of the DC-DC converter across the switching period of the electric switching elements (e.g. PWM period) as well as in a schematic block diagram a switching and current flow state during a fourth time interval of the switching period of the electric switching elements (e.g. PWM period)

FIG. 7d shows in a schematic block diagram 16 the current flow in the DC-DC converter 100 between the times $t_3$ and $t_4$ (during a fourth time interval of the switching period of the electric switching elements $108_1$ to $108_4$ (e.g. PWM period)). Between the times $t_3$ and $t_4$, the DC-DC converter 100 is in the first switching state, i.e., the second electric switching element $108_2$ and the third electric switching element $108_3$ are switched off, while the first electric switching element $108_1$ and the fourth electric switching element $108_4$ are switched on. This results in a fourth current flow state with a first current path extending from the first terminal $110_1$ via the first storage choke $106_1$, the first electric switching element $108_1$ and the intermediate circuit capacitance $118_Z$ to the second terminal $110_2$, and a second current path extending from the fourth terminal $110_4$ via the fourth electric switching element $108_4$ and the second storage choke $106_2$ to the third terminal $110_3$. In other words, FIG. 7d shows a fourth state of the current flow during a switching period of the electric switching elements $108_1$ to $108_4$ (e.g. PWM period).

Figure 7E:
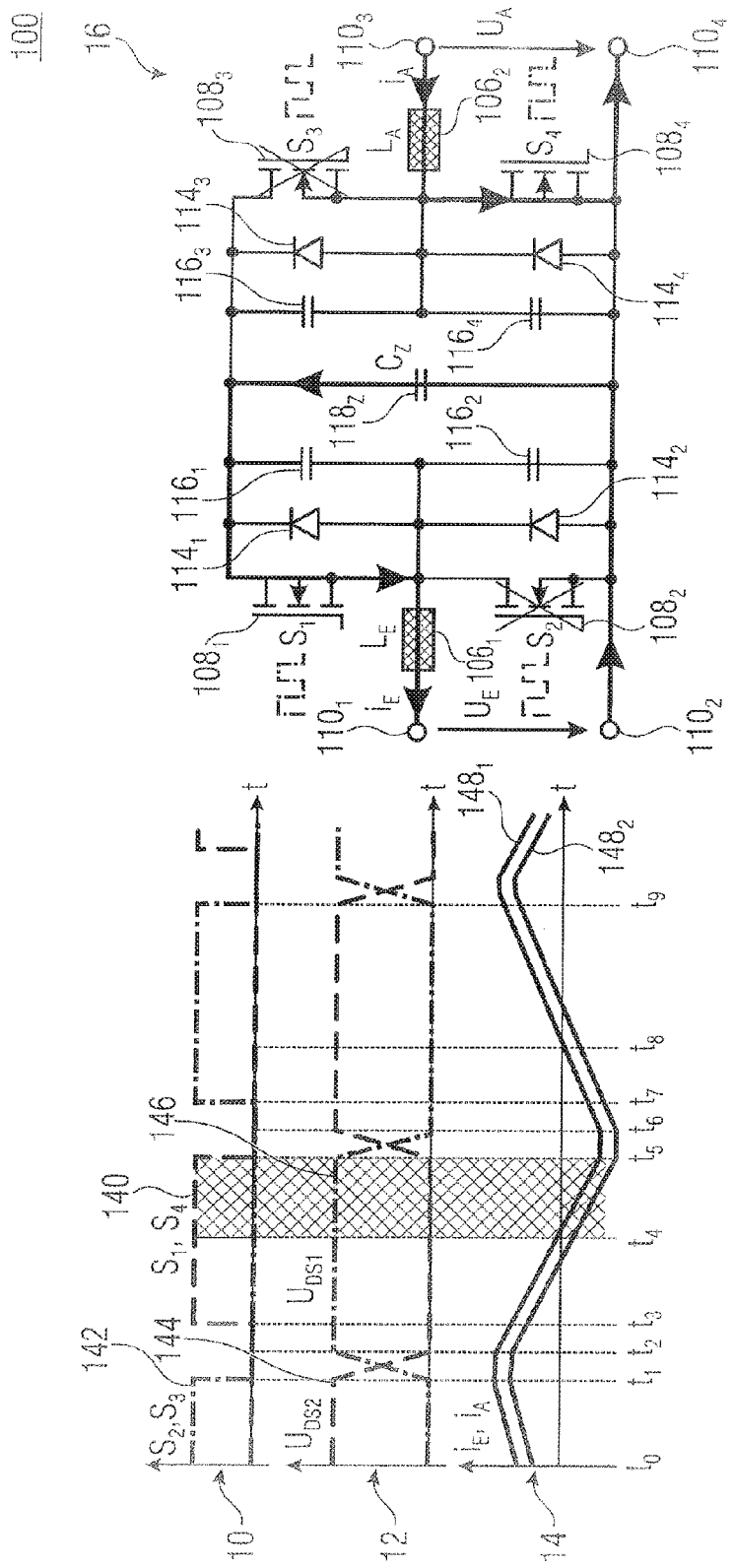
FIG. 7e shows in diagrams the control signal, current and voltage curves of the DC-DC converter across the switching period of the electric switching elements (e.g. PWM period) as well as in a schematic block diagram a switching and current flow state during a fifth time interval of the switching period of the electric switching elements (e.g. PWM period)

FIG. 7e shows in a schematic block diagram 16 the current flow in the DC-DC converter 100 between the times $t_4$ and $t_5$ (during a fifth time interval of the switching period of the electric switching elements $108_1$ to $108_4$ (e.g. PWM period)). Between the times $t_4$ and $t_5$, the DC-DC converter 100 is still in the second switching state. At the time $t_4$, however, the direction of the current flow $i_{L1}$ through the first storage choke $106_1$ and the direction of the current flow $i_{L1}$ through the second storage choke $106_2$ have been inverted. This results in a fifth current flow state with a first current path extending from the second terminal $110_2$ via the intermediate circuit capacitance $118_Z$, the first electric switching element $108_1$ and the first storage choke $106_1$ to the first terminal $110_1$, and a second current path extending from the third terminal $110_3$ via the second storage choke $106_2$ and the fourth electric switching element $108_4$ to the fourth terminal $110_4$. In other words, FIG. 7e shows a fifth state of the current flow during a switching period of the electric switching elements $108_1$ to $108_4$ (e.g. PWM period).

Figure 7F:
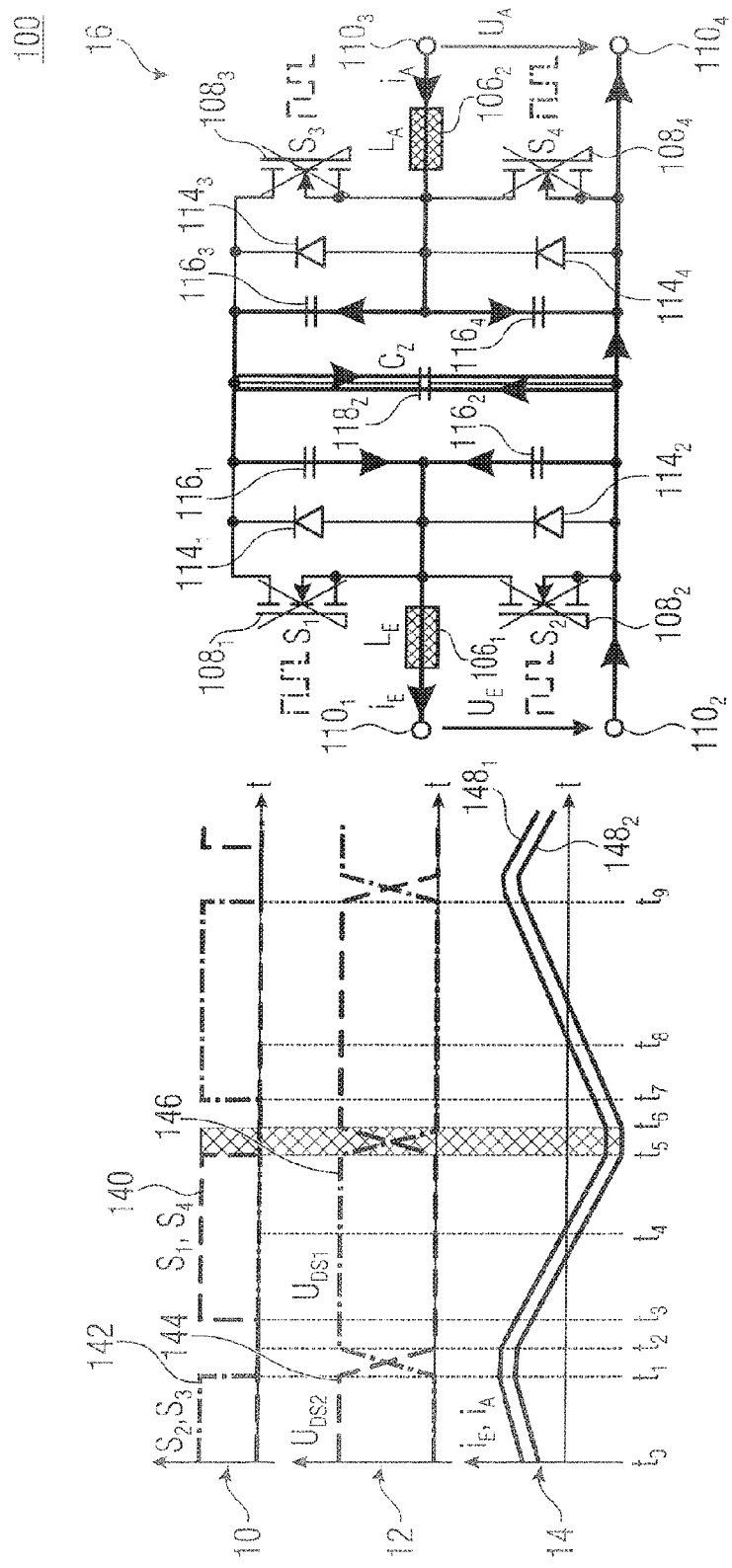
FIG. 7f shows in diagrams the control signal, current and voltage curves of the DC-DC converter across the switching period of the electric switching elements (e.g. PWM period) as well as in a schematic block diagram a switching and current flow state during a sixth time interval of the switching period of the electric switching elements (e.g. PWM period)

FIG. 7f shows in a schematic block diagram 16 the current flow in the DC-DC converter 100 between the times $t_5$ and $t_6$ (during a sixth time interval of the switching period of the electric switching elements $108_1$ to $108_4$ (PWM period)). Between the times $t_5$ and $t_6$, the DC-DC converter 100 is in a dead time switching state, i.e., the first, second, third and fourth electric switching elements $108_1$ to $108_4$ are switched off. The current flow through the first storage choke $106_1$ and the current flow through the second storage choke $106_2$ cannot change suddenly, such that the first storage choke $106_1$ effects continued flow of the current $i_{L1}$ while the second storage choke effects continued flow of the current $i_{L2}$. As shown in FIG. 7f, this results in a sixth current flow state with a first current path extending from the second terminal $110_2$ via the second parasitic capacitance $116_2$ and the first storage choke $106_1$ to the first terminal $110_1$, a second current path extending from the second terminal $110_2$ via the intermediate circuit capacitance $118_Z$, the first parasitic capacitance $116_1$ and the first storage choke $106_1$ to the first terminal $110_1$, a third current path extending from the third terminal $110_3$ via the second storage choke $106_2$ and the fourth parasitic capacitance $116_4$ to the fourth terminal $110_4$, and a fourth current path extending from the third terminal $110_3$ via the second storage choke $106_2$, the third parasitic capacitance $116_3$ and the intermediate circuit capacitance $118_Z$ to the fourth terminal $110_4$, such that the parasitic capacitances $116_1$ and $116_4$ of the first and fourth electric switching elements $108_1$ to $108_4$ are charged after switching off and the parasitic capacitances $116_2$ and $116_3$ of the second and third electric switching elements $108_2$ and $108_3$ are discharged prior to switching on. In other words, FIG. 7f shows a sixth state of the current flow during a switching period of the electric switching elements $108_1$ to $108_4$ (e.g. PWM period).

Figure 7G:
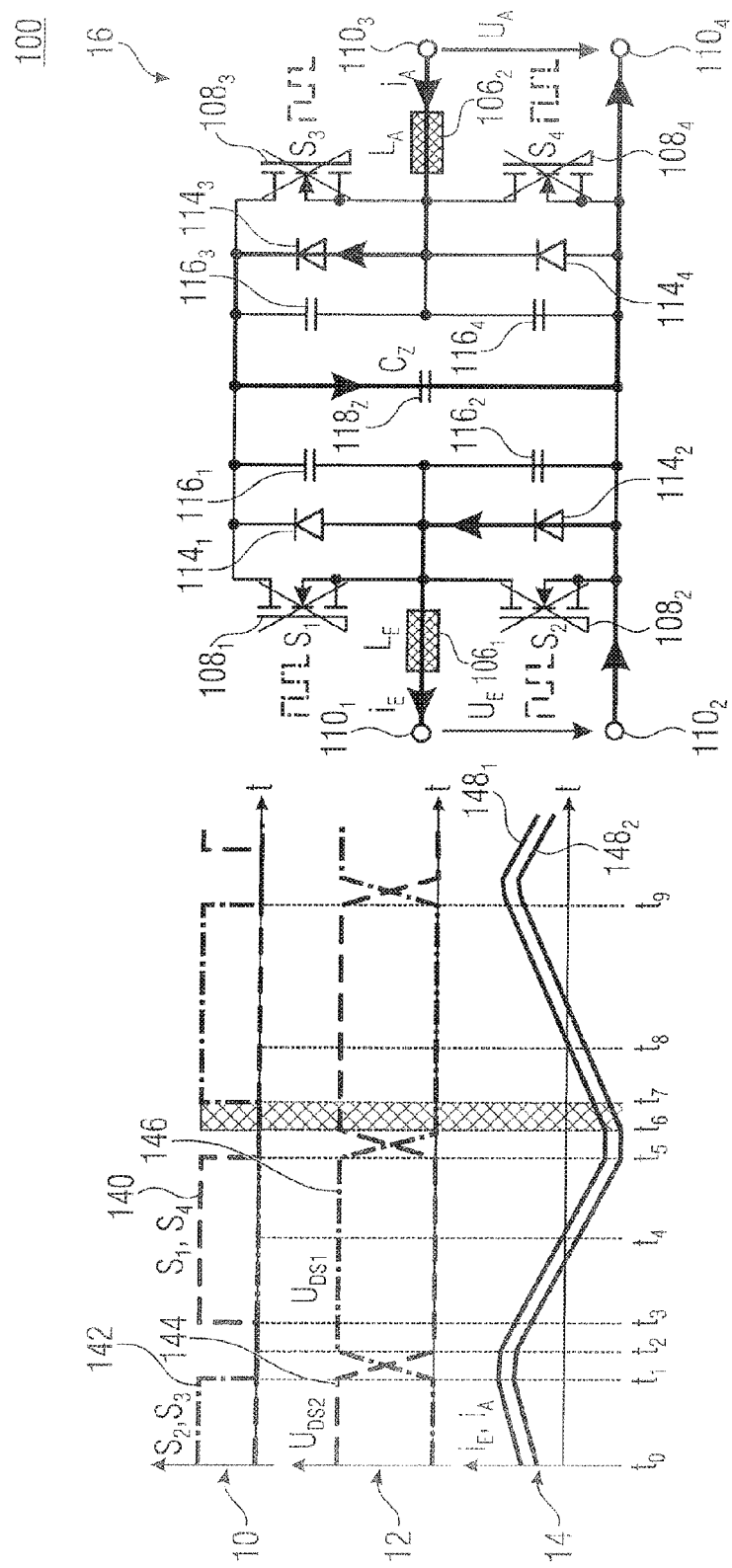
FIG. 7g shows in diagrams the control signal, current and voltage curves of the DC-DC converter across the switching period of the electric switching elements (e.g. PWM period) as well as in a schematic block diagram a switching and current flow state during a seventh time interval of the switching period of the electric switching elements (e.g. PWM period)

FIG. 7g shows in a schematic block diagram 16 the current flow in the DC-DC converter 100 between the times $t_6$ and $t_7$ (during a seventh time period of the switching period of the electric switching elements $108_1$ to $108_4$ (e.g. PWM period)). Between the times $t_6$ and $t_7$, the DC-DC converter 100 is still in the dead time switching state. Since the parasitic capacitances of the previously switched on switching elements are (completely) charged at the time $t_6$ as well as the parasitic capacitances of switching elements to be switched on are (completely) discharged and the first storage choke $106_1$ still effects continued flow of the current $i_{L1}$ and the second storage choke $106_2$ still effects continued flow of the current $i_{L2}$, a seventh current flow state results between the times $t_6$ and $t_7$ with a first current path extending from the second terminal $110_2$ via the second diode $114_2$ and the first storage choke $106_1$ to the first terminal $110_1$, and a second current path extending from the third terminal $110_3$ via the second storage choke $106_2$, the third diode $114_3$ and the intermediate circuit capacitance $118_Z$ to the fourth terminal $110_4$. In other words, FIG. 7g shows a seventh state of the current flow during a switching period of the electric switching elements $108_1$ to $108_4$ (e.g. PWM period).

Figure 7H:
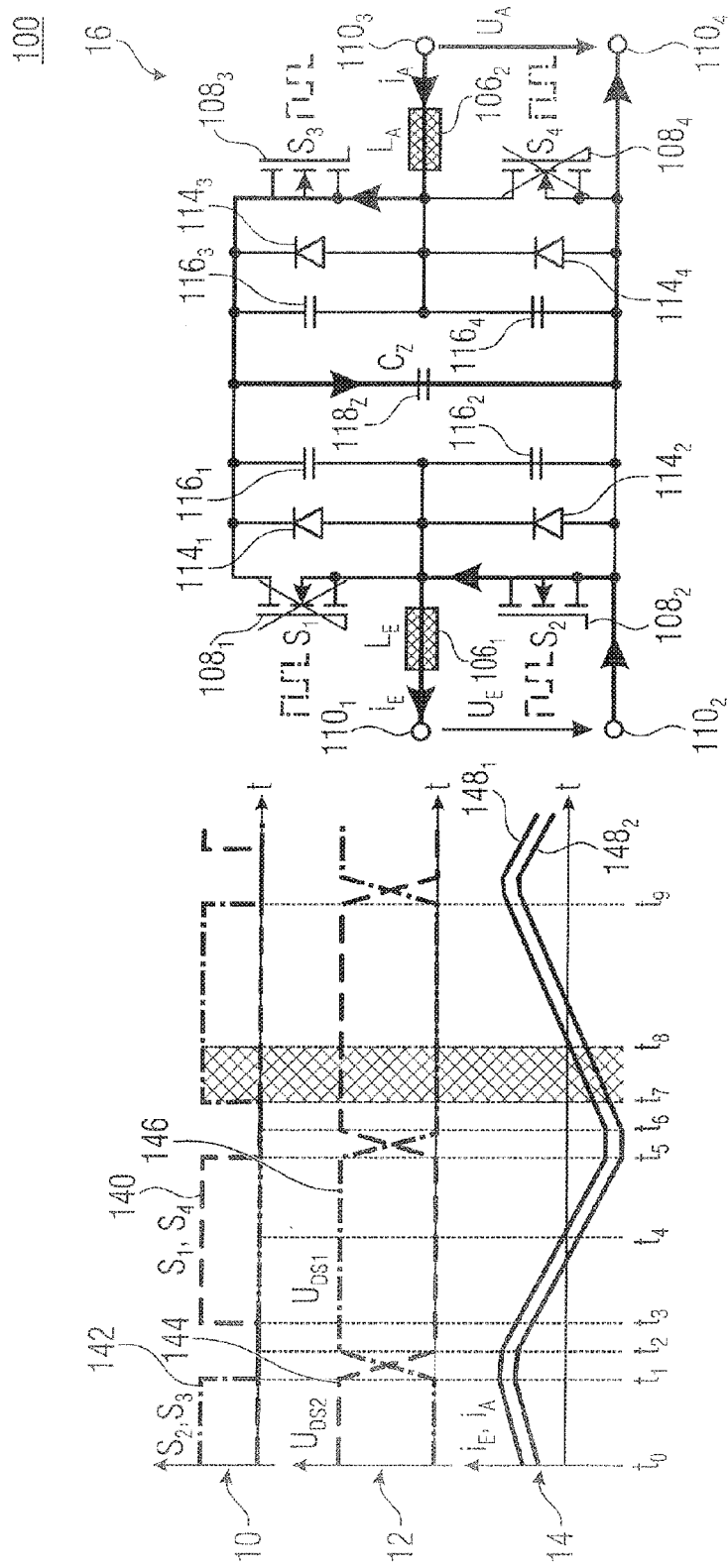
FIG. 7h shows in diagrams the control signal, current and voltage curves of the DC-DC converter across the switching period of the electric switching elements (e.g. PWM period) as well as in a schematic block diagram a switching and current flow state during an eighth time interval of the switching period of the electric switching elements (e.g. PWM period)

FIG. 7h shows in a schematic block diagram 16 the current flow in the DC-DC converter 100 between the times $t_7$ and $t_8$ (during an eighth time interval of the switching period of the electric switching elements $108_1$ to $108_4$ (e.g. PWM period)). Between the times $t_7$ and $t_8$, the DC-DC converter 100 is again in the second switching state, i.e., the first electric switching element $108_1$ and the fourth electric switching element $108_4$ are switched off, while the second electric switching element $108_2$ and the third electric switching element $108_3$ are switched on. This results in an eighth current flow state with a first current path extending from the second terminal $110_2$ via the second electric switching element $108_2$ and the first storage choke $106_1$ to the first terminal $110_1$, and a second current path extending from a third terminal $110_3$ via the second storage choke $106_2$, the third electric switching element $108_3$ and the intermediate circuit capacitance $118_Z$ to the fourth terminal $110_4$. In other words, FIG. 7h shows an eighth state of the current flow during a switching period of the electric switching elements $108_1$ to $108_4$ (e.g. PWM period).

As has already been mentioned, the DC-DC converter 100 can be configured to track or readjust a switching frequency of the electric switching elements $108_1$ to $108_4$ in case of a change of operating parameters of the DC-DC converter 100 such that a change of direction of the current flow through the first storage choke $106_1$ and a change of direction of the current flow through the second storage choke $106_2$ during a switching period of the electric switching elements $108_1$ to $108_4$ is ensured.

The DC-DC converter 100 can be configured, for example, to track or readjust, in the buck-boost mode of the DC-DC converter 100, the switching frequency $f_{nominal1}$ ($f_E$) of the first electric switching element $108_1$ and the second electric switching element $108_2$ within a tolerance range of ±50% based on the formula $$f_{nominal1} = \frac{u_E u_A}{u_E + u_A} \cdot \frac{1}{2 \cdot L1(I_{L1} + |I_{L1,min}|)} \quad \text{(EQ. 1-19)}$$

wherein $u_E$ is a first voltage (input voltage) applied to the first DC voltage gate 102, wherein $u_A$ is a second voltage (output voltage) applied to the second DC voltage gate 104, wherein L1 is an inductance of the first storage choke $106_1$ (inductance $L_E$ of the input storage choke) and wherein $I_{L1}$ is an arithmetic mean of the current flow through the first storage choke $106_1$ (arithmetic mean of the input current $I_E$).

Further, the DC-DC converter can be configured to track or readjust in the buck-boost-mode of the DC-DC converter 100 the switching frequency $f_{nominal2}$ ($f_A$) of the third electric switching element $108_3$ and the fourth electric switching element $108_4$ within a tolerance range of ±50% based on the formula $$f_{nominal2} = \frac{u_E u_A}{u_E + u_A} \cdot \frac{1}{2 \cdot L2(I_{L2} + |I_{L2,min}|)} \quad \text{(GL. 1-20)}$$

wherein $u_E$ is a first voltage (input voltage) applied to the first DC voltage gate 102, wherein $u_2$ is a second voltage (output voltage) applied to the second DC voltage gate 104, wherein L2 is an inductance of the second storage choke $106_2$ (inductance $L_A$ of the output storage choke) and wherein $I_{L2}$, is an arithmetic mean of the current flow through the second storage choke $106_2$ (arithmetic mean of the output current $I_A$).

Further, the DC-DC converter 100 can be configured to determine, based on the switching frequency $f_{nominal1}$ determined from EQ. 1-19 and the switching frequency $f_{nominal2}$ determined from EQ. 1-20, a common switching frequency $f_{nominal}$ for the electric switching elements $108_1$ to $108_4$.

The switching frequency $f_{nominal}$ can be defined as follows, for example via a C-program:

```
f_nominal = min(f_nominal1, f_nominal2), namely:
    if (f_nominal1 >= f_nominal2)
        f_nominal = f_nominal2;
    else
        f_nominal = f_nominal1;
```

In summary, the concept for resonant (switching) loss reduction without transition phase and with frequency modulation can be characterized by the following characteristics.

First, by the control method without transition phase in which the switches $108_1$ ($S_1$) and $108_4$ ($S_4$) are switched on or off continuously complementary to the switches $108_2$ ($S_2$) and $108_3$ ($S_3$). For preventing a short circuit at the DC voltage input gate 102 and at the DC voltage output gate 104 of the DC-DC converter 100, a dead time can be provided between switching on and off the electric switching elements (power semiconductors) $108_1$ to $108_4$.

Second, by the ZVS reduced operation of the electric switching elements (switches) $108_1$ to $108_4$, the current $i_L$ in the storage choke (inductance) 106 can be inverted once within a switching period of the electric switching elements $108_1$ to $108_4$ (e.g. PWM period) by a respective design of the storage choke 106. This has the effect that the parasitic capacitors $116_1$ to $116_4$ of the electric switching elements (e.g. bipolar power semiconductors) $108_1$ to $108_4$ can be discharged prior to their switching on between the dead time of the storage choke current $i_L$. In that way, the electric switching elements $108_1$ to $108_4$ can be (continuously) switched in a soft (ZVS) manner. Thereby, the switching losses can be reduced (or even minimized).

Third, by the modulation of the switching frequency of the electric switching elements $108_1$ to $108_4$, the current ripple in the storage choke (inductance) 106 can be (continuously) adapted by a change of the switching frequency such that, on the one hand, the electric switching elements $108_1$ to $108_4$ are (continuously) operated in a ZVS reduced manner and, on the other hand, the current ripple does not become too great, and the conduction losses in the electric switching elements (switches) $108_1$ to $108_4$ and the losses in the storage choke 106 do not significantly increase.

By using the concept for resonant (switching) loss reduction without transition phase and with frequency modulation (concept 1) the DC-DC converter 100 in the buck-boost-mode can obtain high efficiency both at all voltage operating points and at small power operating points.

In the following, a concept for resonant (switching) loss reduction with transition phase and frequency modulation (concept 2) will be described.

Here, based on the above described concept for resonant (switching) loss reduction without transition phase and with frequency modulation (concept 1), the concept for resonant (switching) loss reduction with transition phase and frequency modulation (concept 2) will be described.

According to the concept for resonant (switching) loss reduction with transition phase and frequency modulation (concept 2), the DC-DC converter 100 can be operated in buck mode, boost mode and buck-boost mode.

As has already been described above in detail, the DC-DC converter 100 can be configured to switch, in the buck-boost mode, between a first switching state in which the first electric switching element $108_1$ and the fourth electric switching element $108_4$ are switched on (and the second electric switching element $108_2$ and the third electric switching element $108_3$ are switched off) and a second switching state in which the second electric switching element $108_2$ and the third electric switching element $108_3$ are switched on (and the first electric switching element $108_1$ and the fourth electric switching element $108_4$ are switched off).

Above that, the DC-DC converter 100 can be configured to switch, in the buck mode, between a third switching state in which the first electric switching element $108_1$ is switched on (and the second electric switching element $108_2$ is switched off) and a fourth switching state in which the second electric switching element $108_2$ is switched on) and the first electric switching element $108_1$ is switched), wherein in the buck mode independent of the switching state the third electric switching element $108_3$ is switched on and the fourth electric switching element $108_4$ is switched off.

Further, the DC-DC converter 100 can be configured to switch, in the boost mode, between a fifth switching state in which the third electric switching element $108_3$ is switched on (and the fourth electric switching element $108_4$ is switched off) and a sixth switching state in which the fourth electric switching element is switched on (and the third electric switching element $108_3$ is switched off), wherein in the boost mode, independent of the switching state, the first electric switching element $108_1$ is switched on and the second electric switching element $108_2$ is switched off.

In other words, in the buck mode, the third electric switching element $108_3$ ($S_3$) is permanently switched on and the fourth electric switching element $108_4$ ($S_4$) is permanently switched off, while the first electric switching element $108_1$ ($S_1$) and the second electric switching element $108_2$ ($S_2$) are switched by complementary control. In comparison, in the boost mode, the first electric switching element $108_1$ ($S_1$) is permanently switched on and the second electric switching element $108_2$ ($S_2$) is permanently switched off, while the third electric switching element $108_3$ ($S_3$) and the fourth electric switching element $108_4$ ($S_4$) are switched by complementary control. In the buck-boost mode, the switches are operated exactly as in the concept for resonant (switching) loss reduction without transition phase and with frequency modulation (concept 1).

Further, the DC-DC converter 100 can be configured to switch the electric switching elements (power semiconductors) $108_1$ to $108_4$ in a ZVS reduced manner in all three modes, i.e. in the buck mode, boost mode and buck-boost mode. In the design of the storage choke 106, it can be considered that the current $i_L$ in the storage choke (inductance) 106 can be inverted within a switching period of the electric switching elements $108_1$ to $108_4$ (e.g. PWM period) for fulfilling the condition for soft switching.

Above that, the current ripple can be continuously adapted by varying the switching frequency to obtain an improved (or even maximum possible) efficiency at all operating points in the three operating modes.

In contrary to the concept for resonant (switching) loss reduction without transition phase and with frequency modulation (concept 1), the optimum switching frequency $f_{nominal}$ for the buck and boost modes is determined as follows:

Optimum switching frequency in the buck mode:

$$u_E - u_A = L \cdot \frac{\Delta i_L}{D \cdot T} = L \cdot \frac{2(I_L + |I_{L,min}|)}{D \cdot T} \rightarrow f_{nominal} = \frac{u_E \cdot u_A - u_A^2}{u_E} \cdot \frac{1}{2 \cdot L(I_L + |I_{L,min}|)} \quad \text{(GL. 2-1)}$$

Optimum switching frequency in the boost mode:

$$u_E = L \cdot \frac{\Delta i_L}{D \cdot T} = L \cdot \frac{2(I_L + |I_{L,min}|)}{D \cdot T} \rightarrow f_{nominal} = \frac{u_E \cdot u_A - u_E^2}{u_A} \cdot \frac{1}{2 \cdot L(I_L + |I_{L,min}|)} \quad \text{(GL. 2-2)}$$

In the following, the two concepts for resonant (switching) loss reduction (without transition phase and with transition phase) described herein will be compared with one another and also compared with the concept shown in US 2012/0146594 A1.

Figure 8:
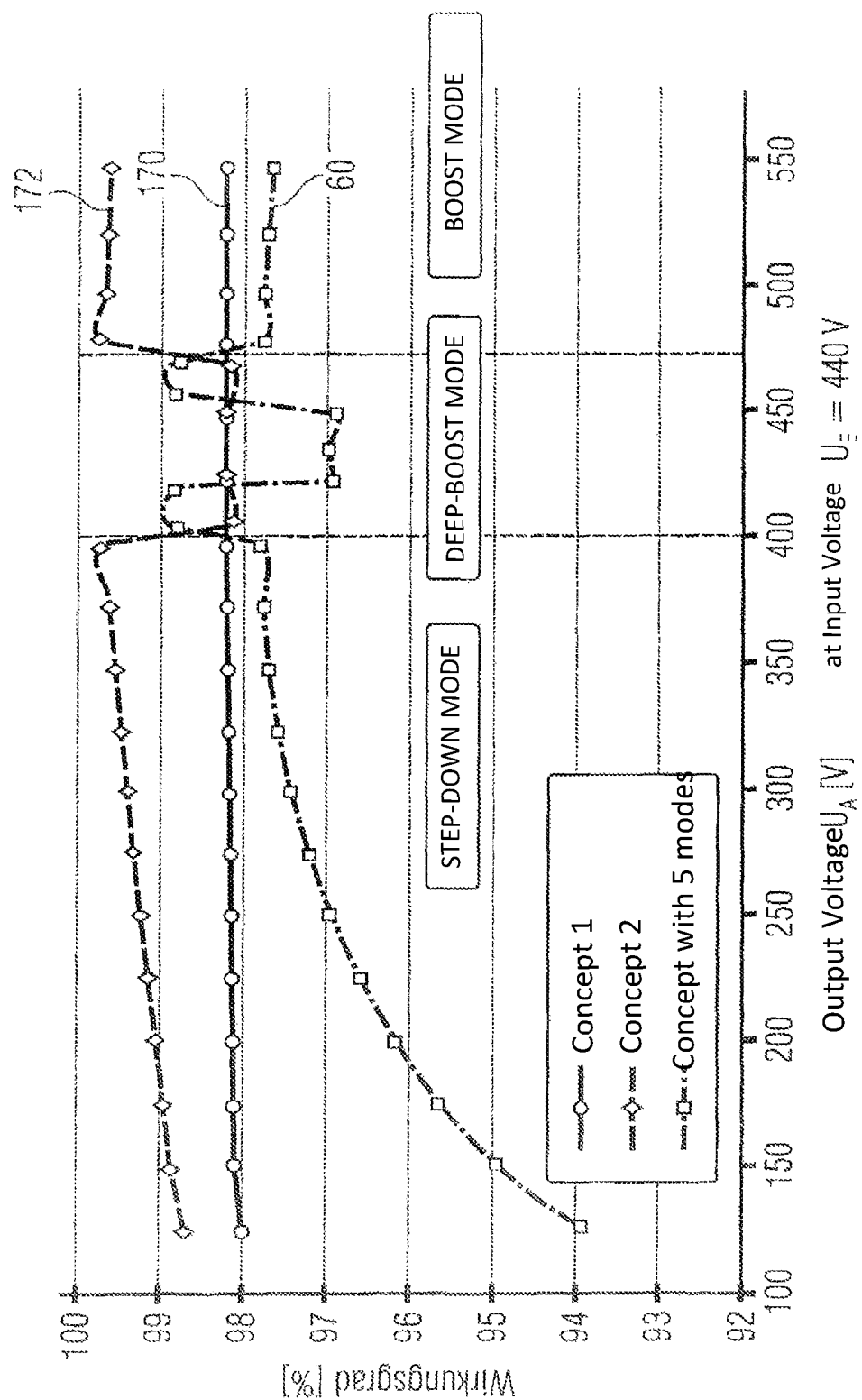
FIG. 8 shows in a diagram the efficiency of the DC-DC converter with resonant (switching) loss reduction without transition phase and frequency modulation, the efficiency of the DC-DC converter with resonant (switching) loss reduction with transition phase and frequency modulation, as well as the efficiency of the DC-DC converter shown in US 2012/0146594 A1 in dependency on the output voltage $U_A$ at an input voltage of $U_E$=440 V and according to a maximum input power allowed according to specification.

In a diagram, FIG. 8 shows the efficiency 170 of the DC-DC converter 100 with resonant (switching) loss reduction without transition phase and frequency modulation (concept 1), the efficiency 172 of the DC-DC converter 100 with resonant (switching) loss reduction with transition phase and frequency modulation (concept 2) as well as the efficiency 60 of the DC-DC converter shown in US 2012/0146594 A1 (concept with 5 modes) in dependence on the output voltage $U_A$ at an input voltage of $U_E$=440 V and maximum input power allowed according to specification.

Figure 9:
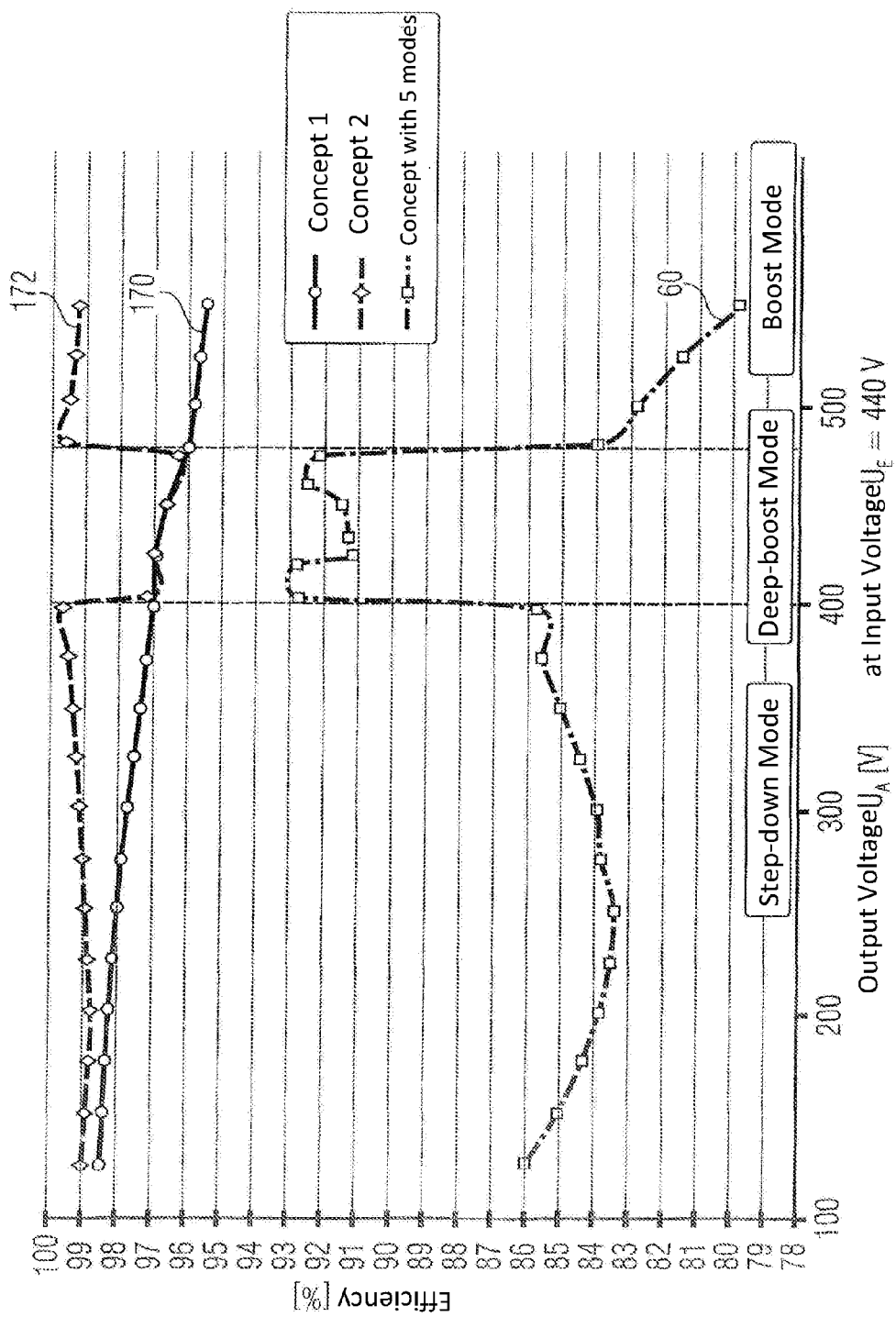
FIG. 9 shows in a diagram the efficiency of the DC-DC converter with resonant (switching) loss reduction without transition phase and frequency modulation, the efficiency of the DC-DC converter with resonant (switching) loss reduction with transition phase and frequency modulation, as well as the efficiency of the DC-DC converter shown in US 2012/0146594 A1 in dependency on the output voltage $U_A$ at an input voltage of $U_E$=440 V at 12% of the input power to be provided at a maximum.

FIG. 9 shows in a diagram the efficiency 170 of the DC-DC converter 100 with resonant (switching) loss reduction without transition phase and frequency modulation (concept 1), the efficiency 172 of the DC-DC converter 100 with resonant (switching) loss reduction with transition phase and frequency modulation, as well as the efficiency of the DC-DC converter shown in US 2012/0146594 A1 (concept with 5 modes) in dependence on the output voltage $U_A$ at an input voltage of $U_E$=440 V at twelve percent of the input power to be provided at a maximum.

Figure 10:
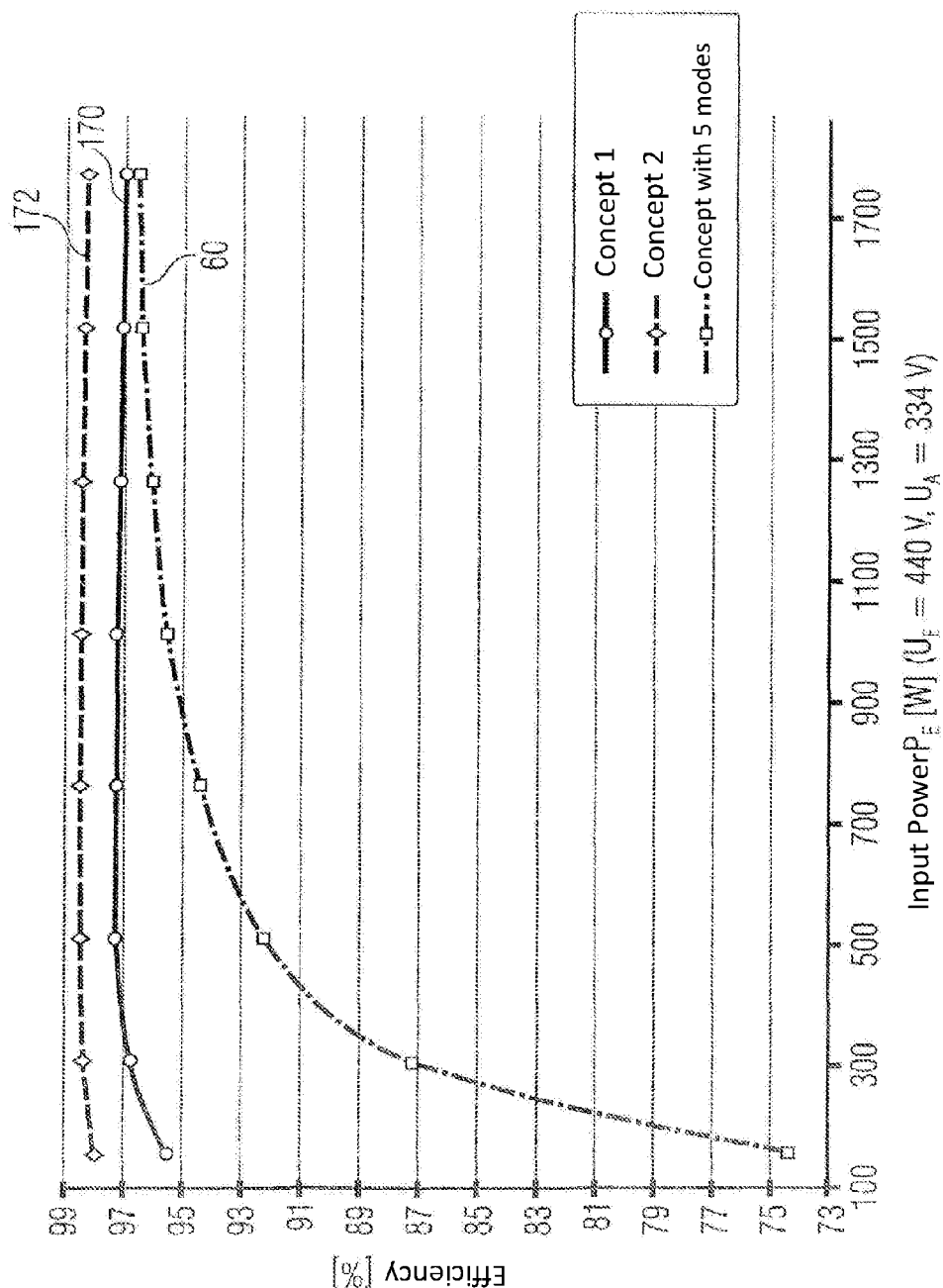
FIG. 10 shows in a diagram the efficiency of the DC-DC converter with resonant (switching) loss reduction without transition phase and frequency modulation, the efficiency of the DC-DC converter with resonant (switching) loss reduction with transition phase and frequency modulation, as well as the efficiency of the DC-DC converter shown in US 2012/0146594 A1 in dependency on the input power at an input voltage of $U_E$=440 V and an output voltage of $U_A$=334 V.

FIG. 10 shows in a diagram the efficiency 170 of the DC-DC converter 100 with resonant (switching) loss reduction without transition phase and frequency modulation (concept 1), the efficiency 172 of the DC-DC converter 100 with resonant (switching) loss reduction with transition phase and frequency modulation, as well as the efficiency 60 of the DC-DC converter shown in US 2012/0146594 A1 (concept with 5 modes) in dependence on the input power at an input voltage of $U_E$=440V and an output voltage of $U_A$=334V.

In other words, FIGS. 8 to 10 compare and show the efficiency 170 of the concept for resonant (switching) loss reduction without transition phase and with frequency modulation (concept 1), the efficiency 172 of the concept for resonant (switching) loss reduction with transition phase and with frequency modulation (concept 2) and the efficiency 60 of the concept presented in US 2012/0146594 A1 (concept with 5 modes).

For the comparison in FIG. 8, it is assumed that with a limitation of input and output current, the maximum possible power is transported at different voltage operating points by the buck-boost converter 100. In the comparison illustrated in FIG. 9, the DC-DC converter 100 is loaded with 12% of the power to be provided at a maximum at different voltage operating points. FIG. 10 shows the efficiency in dependence on the input power at the voltage operating point $U_E$=440V and $U_A$=334 V. The following curves of the efficiency have been determined by means of respective simulation software. Here, both the switching and conduction losses in the electric switching elements (power semiconductors) $108_1$ and $108_4$ and the converter and core losses in the storage chokes 106 have been considered.

From the comparisons in FIGS. 8 to 10 it can be seen that the efficiency of the buck-boost converter when using the concept for resonant (switching) loss reduction without transition phase and with frequency modulation (concept 1) is improved with respect to the concept shown in US 2012/0146594 A1 (concept with 5 modes) both in different voltage ranges and in different power ranges. The concept for resonant (switching) loss reduction with transition phase and with frequency modulation (concept 2) allows even better system efficiency based on the concept for resonant (switching) loss reduction without transition phase and with frequency modulation (concept 2).

Figure 11:
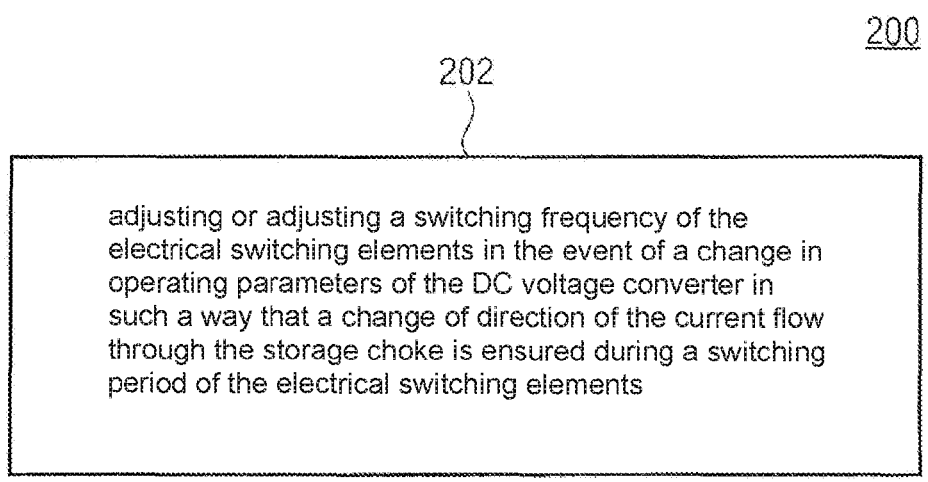
FIG. 11 shows a flow diagram of a method for operating a DC-DC converter according to an embodiment of the present invention.

FIG. 11 shows a flow diagram of a method 200 for operating a DC-DC converter 100 according to an embodiment. The DC-DC converter includes a first DC voltage gate 102, a second DC voltage gate 104 and a storage choke 106 coupled between the first DC voltage gate 102 and the second DC voltage gate 104 by means of electric switching elements $108_1$ to $108_n$, wherein the DC voltage converter 100 is configured such that a direction of a current flow through the storage choke 106 is inverted at least once during a switching period of the electric switching elements $108_1$ to $108_n$. The method 200 includes a step 202 of tracking or readjusting a switching frequency of the electric switching elements $108_1$ to $108_n$ in case of a change of operating parameters of the DC-DC converter 100 such that a change of direction of the current flow through the storage choke 106 during a switching period of the electric switching elements $108_1$ to $108_n$ is ensured.

In summary, the embodiments of the present invention relate to a bidirectional cascaded buck-boost converter 100 and in particular to two concepts for designing and controlling the buck-boost converter 100. With these concepts, the efficiency of the DC-DC converter 100 can be improved both in the whole voltage range and at small powers.

Further embodiments provide a DC-DC converter 100 with a first DC voltage gate 102, a second DC voltage gate 104 and a storage choke 106 coupled between the first DC voltage gate 102 and the second DC voltage gate 104 by means of electric switching elements $108_1$ to $108_n$. The DC-DC converter 100 is configured such that a direction of a current flow $i_L$ through the storage choke 106 is inverted at least once during a switching period of the electric switching elements $108_1$ to $108_n$. Further, the DC-DC converter 100 is configured to track or readjust a switching frequency of the electric switching elements $108_1$ to $108_n$ in case of a change of operating parameters of the DC-DC converter 100 such that a change of direction of the current flow $i_L$ through the storage choke 106 during a switching period of the electric switching elements $108_1$ to $108_n$ is ensured. Here, the storage choke 106 is dimensioned such that a minimum value of the current flow $i_L$ through the storage choke 106 at a nominal switching frequency is so great that in case of a change of operating parameters of the DC-DC converter 100 it is ensured for at least two subsequent switching periods of the electric switching elements $108_1$ to $108_n$ without tracking the switching frequency of the electric switching elements $108_1$ to $108_n$ that during the at least two switching periods the direction of the current flow $i_L$ through the storage choke 106 of the electric switching elements is respectively inverted at least once.

In embodiments, the DC-DC converter 100 can be configured to track the switching frequency of the electric switching elements $108_1$ to $108_n$ at the earliest after two subsequent switching periods of the electric switching elements $108_1$ to $108_n$.

In embodiments, the minimum value of the current flow through the storage choke 106 at a nominal switching frequency can be dimensioned such that a change of direction of the current flow through the storage choke 106 during a switching period of the electric switching elements $108_1$ to $108_n$ is ensured and the switching frequency is tracked to a new nominal frequency after at least two (or more than two) switching periods, such that the minimum current flow $I_{L,min}$ through the storage choke 106 remains less than zero.

In embodiments, the storage choke 106 can be dimensioned, according to EQ. 1-13 such that the minimum value of the current flow $I_{L,min}$ through the storage choke 106 is so great that the switching frequency only has to be tracked to a new nominal frequency $f_{nominal}$ after more than two switching periods and it is further ensured that a direction of the current flow $i_L$ through the storage choke 106 is inverted at least once (e.g. exactly twice) during a switching period of the electric switching elements $108_1$ to $108_n$.

Here, the nominal switching frequency can be the frequency that is used as a basis when dimensioning the DC-DC converter.

When dimensioning the DC-DC converter, the value of the storage choke can be configured such that, for example, the minimum current flow $I_{L,min}$ through the storage choke 106 is ten percent of the average of the coil current. When assuming an input voltage of 400 V, an output voltage of 200 V, an average coil current of 5 A and a nominal switching frequency of 50 kHz, an embodiment according to EQ 1-13 results in a value of 242 µH for the storage choke.

In embodiments, the DC-DC converter 100 can further be configured such that a dead time of the electric switching elements $108_1$ to $108_n$ during a switching period of the electric switching elements $108_1$ to $108_n$ is constant.

Although some aspects have been described in the context of an apparatus, it is clear that these aspects also represent a description of the corresponding method, such that a block or device of an apparatus corresponds to a corresponding method step or a feature of a method step. Analogously, aspects described in the context of a method step also represent a description of a corresponding block or item or feature of a corresponding apparatus. Some or all of the method steps may be executed by a hardware apparatus (or by using a hardware apparatus), like for example, a microprocessor, a programmable computer or an electronic circuit. In some embodiments, some or several of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, a ROM, a PROM, an EPROM, an EEPROM or a FLASH memory, a hard drive or any other magnetic or optical memory having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may for example be stored on a machine readable carrier.

Other embodiments comprise the computer program for performing one of the methods described herein, wherein the computer program is stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer a computer program for performing at least one of the methods described herein to a receiver. The transmission can be, for example, electronical or optical. The receiver may, for example, be a computer, a mobile device, a memory device or the like. The apparatus or system may, for example, comprise a file server for transferring the computer program to the receiver.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. The same can be a universally usable hardware such as a computer processor (CPU) or hardware specific for the method, such as an ASIC.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. DC-DC converter, comprising:
a first DC voltage gate;
a second DC voltage gate; and
a storage choke coupled between the first DC voltage gate and the second DC voltage gate by means of electric switching elements;
wherein the DC-DC converter is configured such that a direction of a current flow through the storage choke is inverted at least once during a switching period of the electric switching elements; and
wherein the DC-DC converter is configured to track or readjust a switching frequency of the electric switching elements in case of a change of operating parameters of the DC-DC converter such that a change of direction of the current flow through the storage choke during a switching period of the electric switching elements is ensured,
wherein the DC-DC converter is configured to track or readjust, in a buck-boost mode of the DC-DC converter, the switching frequency $f_{nominal}$ of the electric switching elements within a tolerance range of ±50% based on the formula $$f_{nominal} = \frac{u_1 u_2}{u_1 + u_2} \cdot \frac{1}{2L(I_L + |I_{L,min}|)}$$

wherein $u_1$ is a first voltage applied to the first DC voltage gate, wherein $u_2$ is a second voltage applied to the second DC voltage gate, wherein L is an inductance of the storage choke and wherein $I_L$ is an arithmetic mean of the current flow through the storage choke.

2. DC-DC converter according to claim 1, wherein the storage choke is dimensioned such that a direction of a current flow through the storage choke is inverted at least once during a switching period of the electric switching elements.

3. DC-DC converter according to claim 2, wherein the storage choke is dimensioned such that a current ripple of the current flow through the storage choke is so great that a direction of a current flow through the storage choke is inverted at least once during a switching period of the electric switching elements.

4. DC-DC converter according to claim 2, wherein the storage choke is further dimensioned such that by the current flow through the storage choke, parasitic capacitances of electric switching elements to be switched on are discharged prior to switching on.

5. DC-DC converter according to claim 2, wherein the storage choke is further dimensioned such that by the current flow through the storage choke, parasitic capacitances of previously switched on electric switching elements are charged.

6. DC-DC converter according to claim 2, wherein the storage choke is dimensioned such that during a dead time of the DC-DC converter during which the electric switching elements are switched off, parasitic capacitances of the electric switching elements that are switched on after the dead time are discharged by the current flow through the storage choke, and parasitic capacitances of the electric switching elements that where switched on prior to the dead time are charged by the current flow through the storage choke.

7. DC-DC converter according to claim 2, wherein the storage choke is dimensioned such that zero voltage switching of the electric switching elements is ensured.

8. DC-DC converter according to claim 1, wherein a permeability of a core of the storage choke is dimensioned such that core losses are reduced.

9. DC-DC converter according to claim 1, wherein the DC-DC converter is configured to further track or readjust the switching frequency of the electric switching elements such that a current ripple of the current flow through the storage choke is so great that a direction of a current flow through the storage choke is inverted at least once during a switching period of the electric switching elements.

10. DC-DC converter according to claim 9, wherein the DC-DC converter is configured to further track or readjust the switching frequency of the electric switching elements such that the current ripple of the current flow through the storage choke is at least so great that parasitic capacitances of electric switching elements to be turned on are discharged to at least 25% of a first voltage applied to the first DC voltage gate or a second voltage applied to the second DC voltage gate prior to switching on.

11. DC-DC converter according to claim 10, wherein the DC-DC converter is configured to determine the first voltage $u_1$ applied to the first DC voltage gate, the second voltage $u_2$ applied to the second DC voltage gate or the arithmetic mean of the current flow $I_L$ through the storage choke by using at least one measurement sensor.

12. DC-DC converter according to claim 1,
wherein a first electric switching element and a second electric switching element of the electric switching elements are connected in series between a first terminal and a second terminal of the first DC voltage gate, and a third electric switching element and a fourth electric switching element of the electric switching elements are connected in series between a third terminal and a fourth terminal of the second DC voltage gate; and wherein the storage choke is connected in series between a first node and a second node, wherein the first node is connected in series between the first electric switching element and the second electric switching element, and the second node is connected in series between the third electric switching element and the fourth electric switching element.

13. DC-DC converter according to claim 12, wherein the DC-DC converter is configured to switch, in a buck-boost mode of the DC-DC converter, between a first switching state in which the first electric switching element and the fourth electric switching element are switched on and a second switching state in which the second electric switching element and the third electric switching element are switched on.

14. DC-DC converter according to claim 13, wherein the DC-DC converter is configured to switch between the switching states such that the switching comprises a dead time in which the electric switching elements are switched off.

15. DC-DC converter according to claim 12, wherein the DC-DC converter is configured to switch, in a buck mode of the DC-DC converter, between a third switching state in which the first electric switching element is switched on and a fourth switching state in which the second electric switching element is switched on, wherein, in the buck mode, independent of the switching state the third electric switching element is switched on and the fourth electric switching element is switched off.

16. DC-DC converter according to claim 12, wherein the DC-DC converter is configured to switch, in a boost mode of the DC-DC converter, between a fifth switching state in which the third electric switching element is switched on and a sixth switching state in which the fourth electric switching element is switched on, wherein, in the boost mode, independent of the switching state the first electric switching element is switched on and the second electric switching element is switched off.

17. DC-DC converter according to claim 1,
wherein a first electric switching element and a second electric switching element of the electric switching elements are connected in series between an intermediate circuit node and a second terminal of the first DC voltage gate, and a third electric switching element and a fourth electric switching element of the electric switching elements are connected in series between the intermediate circuit node and a fourth terminal of the second DC voltage gate;

wherein the storage choke is a first storage choke and the DC-DC converter further comprises a second storage choke, wherein the first storage choke is connected in series between a first terminal of the first DC voltage gate and a first node, wherein the second storage choke is connected in series between a third terminal of the second DC voltage gate and a second node, wherein the first node is connected in series between the first electric switching element and the second electric switching element, and the second node is connected in series between the third electric switching element and the fourth electric switching element.

18. DC-DC converter according to claim 17, wherein the DC-DC converter is configured to switch, in a buck-boost mode of the DC-DC converter, between a first switching state in which the first electric switching element and the fourth electric switching element are switched on, and a second switching state in which the second electric switching element and the third electric switching element are switched on.

19. DC-DC converter, comprising:
a first DC voltage gate;
a second DC voltage gate; and
a storage choke coupled between the first DC voltage gate and the second DC voltage gate by means of electric switching elements;
wherein the DC-DC converter is configured such that a direction of a current flow through the storage choke is inverted at least once during a switching period of the electric switching elements; and
wherein the DC-DC converter is configured to track or readjust a switching frequency of the electric switching elements in case of a change of operating parameters of the DC-DC converter such that a change of direction of the current flow through the storage choke during a switching period of the electric switching elements is ensured,
wherein the DC-DC converter is configured to track or readjust, in a buck mode of the DC-DC converter, the switching frequency $f_{nominal}$ of the electric switching elements within a tolerance range of ±50% based on the formula $$f_{nominal} = \frac{u_1 u_2 - u_2^2}{u_1} \cdot \frac{1}{2L(I_L + |I_{L,min}|)}$$

wherein $u_1$ is a first voltage applied to the first DC voltage gate, wherein $u_2$ is a second voltage applied to the second DC voltage gate, wherein L is an inductance of the storage choke, wherein $I_L$ is an arithmetic mean of the current flow through the storage choke and wherein $I_{L,min}$ is a minimum value of the current flow through the storage choke within a switching period of the electric switching elements.

20. DC-DC converter, comprising:
a first DC voltage gate;
a second DC voltage gate; and
a storage choke coupled between the first DC voltage gate and the second DC voltage gate by means of electric switching elements;
wherein the DC-DC converter is configured such that a direction of a current flow through the storage choke is inverted at least once during a switching period of the electric switching elements; and
wherein the DC-DC converter is configured to track or readjust a switching frequency of the electric switching elements in case of a change of operating parameters of the DC-DC converter such that a change of direction of the current flow through the storage choke during a switching period of the electric switching elements is ensured,
wherein the DC-DC converter is configured to track or readjust, in a boost mode of the DC-DC converter, the switching frequency $f_{nominal}$ of the electric switching elements within a tolerance range of ±50% based on the formula $$f_{nominal} = \frac{u_1 u_2 - u_1^2}{u_2} \cdot \frac{1}{2L(I_L + |I_{L,min}|)}$$

wherein $u_1$ is a first voltage applied to the first DC voltage gate, wherein $u_2$ is a second voltage applied to the second DC voltage gate, wherein L is an inductance of the storage choke and wherein $I_{L,min}$ is a minimum value of the current flow through the storage choke within a switching period of the electric switching elements.

21. Method for operating a DC-DC converter comprising a first DC voltage gate, a second DC voltage gate and a storage choke coupled between the first DC voltage gate and the second DC voltage gate by means of electric switching elements, wherein the DC-DC converter is configured such that a direction of a current flow through the storage choke is inverted at least once during a switching period of the electric switching elements, the method comprising:
tracking or readjusting a switching frequency of the electric switching elements in case of a change of operating parameters of the DC-DC converter such that a change of direction of the current flow through the storage choke during a switching period of the electric switching elements is ensured,
wherein the tracking or readjusting of the switching frequency $f_{nominal}$ of the electric switching elements of the DC-DC converter, in a buck-boost mode of the DC-DC converter, is within a tolerance range of ±50% based on the formula $$f_{nominal} = \frac{u_1 u_2}{u_1 + u_2} \cdot \frac{1}{2L(I_L + |I_{L,min}|)}$$

wherein $u_1$ is a first voltage applied to the first DC voltage gate, wherein $u_2$ is a second voltage applied to the second DC voltage gate, wherein L is an inductance of the storage choke and wherein $I_L$ is an arithmetic mean of the current flow through the storage choke.

22. Method for operating a DC-DC converter comprising a first DC voltage gate, a second DC voltage gate and a storage choke coupled between the first DC voltage gate and the second DC voltage gate by means of electric switching elements, wherein the DC-DC converter is configured such that a direction of a current flow through the storage choke is inverted at least once during a switching period of the electric switching elements, the method comprising:
tracking or readjusting a switching frequency of the electric switching elements in case of a change of operating parameters of the DC-DC converter such that a change of direction of the current flow through the storage choke during a switching period of the electric switching elements is ensured,
wherein the tracking or readjusting of the switching frequency $f_{nominal}$ of the electric switching elements of the DC-DC converter, in a buck mode of the DC-DC converter, is within a tolerance range of ±50% based on the formula $$f_{nominal} = \frac{u_1 u_2 - u_2^2}{u_1} \cdot \frac{1}{2L(I_L + |I_{L,min}|)}$$

wherein $u_1$ is a first voltage applied to the first DC voltage gate, wherein $u_2$ is a second voltage applied to the second DC voltage gate, wherein L is an inductance of the storage choke, wherein $I_L$ is an arithmetic mean of the current flow through the storage choke and wherein $I_{L,min}$ is a minimum value of the current flow through the storage choke within a switching period of the electric switching elements.

23. Method for operating a DC-DC converter comprising a first DC voltage gate, a second DC voltage gate and a storage choke coupled between the first DC voltage gate and the second DC voltage gate by means of electric switching elements, wherein the DC-DC converter is configured such that a direction of a current flow through the storage choke is inverted at least once during a switching period of the electric switching elements, the method comprising:
tracking or readjusting a switching frequency of the electric switching elements in case of a change of operating parameters of the DC-DC converter such that a change of direction of the current flow through the storage choke during a switching period of the electric switching elements is ensured,
wherein the tracking or readjusting of the switching frequency $f_{nominal}$ of the electric switching elements of the DC-DC converter, in a boost mode of the DC-DC converter, is within a tolerance range of ±50% based on the formula $$f_{nominal} = \frac{u_1 u_2 - u_1^2}{u_2} \cdot \frac{1}{2L(I_L + |I_{L,min}|)}$$

wherein $u_1$ is a first voltage applied to the first DC voltage gate, wherein $u_2$ is a second voltage applied to the second DC voltage gate, wherein L is an inductance of the storage choke and wherein $I_{L,min}$ is a minimum value of the current flow through the storage choke within a switching period of the electric switching elements.

* * * * *